United States Patent
Bhasme et al.

(10) Patent No.: US 12,466,292 B2
(45) Date of Patent: Nov. 11, 2025

(54) DUAL ENERGY STORAGE POWERTRAIN CONFIGURATIONS AND METHODS FOR CONTROLLING THE SAME

(71) Applicant: ELECTRA VEHICLES, INC., Boston, MA (US)

(72) Inventors: Saurabh Bhasme, Allston, MA (US); Thomas James Couture, Allston, MA (US); Fabrizio Martini, Boston, MA (US)

(73) Assignee: ELECTRA VEHICLES, INC., Boston, MA (US)

( * ) Notice: Subject to any disclaimer, the term of this patent is extended or adjusted under 35 U.S.C. 154(b) by 343 days.

(21) Appl. No.: 18/026,074

(22) PCT Filed: Sep. 13, 2021

(86) PCT No.: PCT/US2021/050133
§ 371 (c)(1),
(2) Date: Mar. 13, 2023

(87) PCT Pub. No.: WO2022/056421
PCT Pub. Date: Mar. 17, 2022

(65) Prior Publication Data
US 2023/0356625 A1 Nov. 9, 2023

Related U.S. Application Data

(60) Provisional application No. 63/077,934, filed on Sep. 14, 2020.

(51) Int. Cl.
*B60L 58/22* (2019.01)
*B60K 17/356* (2006.01)
(Continued)

(52) U.S. Cl.
CPC ............. *B60L 58/22* (2019.02); *B60K 17/356* (2013.01); *B60L 7/16* (2013.01); *B60L 50/60* (2019.02); *B60L 58/20* (2019.02); *B60L 2210/10* (2013.01)

(58) Field of Classification Search
CPC .......... B60L 58/22; B60L 50/60; B60L 58/20; B60L 7/16; B60L 2210/10; B60K 17/356
(Continued)

(56) References Cited

U.S. PATENT DOCUMENTS 8,360,184 B2 * 1/2013 Kydd ...................... B60L 58/12
180/65.265
8,892,288 B2 * 11/2014 Derflinger ........... B60L 15/2045
701/87

(Continued)

FOREIGN PATENT DOCUMENTS

WO 2019126802 A1 6/2019

OTHER PUBLICATIONS

Extended European Search Report from the European Patent Office for European Application No. 21867787.0 dated Sep. 18, 2024, 10 pages.

(Continued)

*Primary Examiner* — Alfonso Perez Borroto
(74) *Attorney, Agent, or Firm* — Pierce Atwood LLP

(57) ABSTRACT

A powertrain system for a vehicle is described. The powertrain system includes a first energy storage unit, a second energy storage unit, and an electronic control unit coupled to the first energy storage unit and the second energy storage unit. The first energy storage unit is configured to provide power to drive a first set of wheels of the vehicle. The second energy storage unit is configured to provide power to drive a second set of wheels of the vehicle different from the first set of wheels. The first and second energy storage units have (Continued)

different energy storage and/or energy discharge characteristics. The electronic control unit is programmed to control a charge and/or a discharge operation of the first energy storage unit and the second energy storage unit. The powertrain system is capable of implementing control strategies for optimizing energy and power to meet various driving demands of the vehicle.

20 Claims, 8 Drawing Sheets

(51) Int. Cl.
  *B60L 7/16*    (2006.01)
  *B60L 50/60*   (2019.01)
  *B60L 58/20*   (2019.01)
(58) Field of Classification Search
  USPC .......................................................... 307/10.1
  See application file for complete search history.

(56) References Cited

U.S. PATENT DOCUMENTS

| | | |
|---|---|---|
| 2012/0316717 A1 | 12/2012 | Daum et al. |
| 2013/0234675 A1 | 9/2013 | King et al. |
| 2015/0060172 A1* | 3/2015 | Manganaro ............. B60L 58/10 |
| | | 180/165 |
| 2016/0052417 A1 | 2/2016 | Zhou et al. |
| 2018/0244161 A1* | 8/2018 | Nguyen .................... B60L 1/02 |
| 2019/0283611 A1* | 9/2019 | Conlon ................... H02J 3/322 |
| 2019/0299806 A1 | 10/2019 | Oyama et al. |
| 2020/0384888 A1* | 12/2020 | Hasan ...................... B60L 58/12 |
| 2021/0078429 A1* | 3/2021 | Li ............................ B60L 58/21 |
| 2021/0094442 A1* | 4/2021 | Wang ................ H01M 10/4207 |
| 2021/0101495 A1* | 4/2021 | Kava ...................... B60L 53/14 |

OTHER PUBLICATIONS

International Search Report and Written Opinion of the International Searching Authority mailed Dec. 22, 2021.

\* cited by examiner

DUAL ENERGY STORAGE POWERTRAIN CONFIGURATIONS AND METHODS FOR CONTROLLING THE SAME

CROSS-REFERENCE TO RELATED APPLICATIONS

This application is a national stage filing under 35 U.S.C. § 371 of International Patent Application No. PCT/US2021/050133, filed Sep. 13, 2021, entitled, "DUAL ENERGY STORAGE POWERTRAIN CONFIGURATIONS AND METHODS FOR CONTROLLING THE SAME," which claims the benefit under 35 U.S.C. § 119(e) of U.S. Provisional Patent Application No. 63/077,934, filed Sep. 14, 2020, entitled, "DUAL ENERGY STORAGE POWERTRAIN CONFIGURATIONS," the entire contents of each of which is incorporated herein by reference.

BACKGROUND

Energy storage systems, such as battery systems, ultracapacitor systems, and the like, can be optimized for various applications including for use in electric vehicles. Some energy storage systems, referred to herein as high energy storage units or HEU, are configured to store large amounts of energy on a unit mass and/or volume basis. Other energy storage systems, referred to herein as high power units or HPU, are configured to provide large amounts of power over shorter time intervals. Some existing applications use multiple types of energy storage units, e.g., both HEU and HPU, to take advantage of the benefits of each energy storage unit. Such implementations are sometimes referred to more generally as heterogeneous energy storage systems or more specifically as dual energy storage systems when two different types of energy storage units are used.

SUMMARY

The inventors have recognized and appreciated that improved dual energy storage powertrain configurations and methods for controlling the same can be devised. Such improved systems and methods in accordance with some embodiments employ multiple types of energy storage systems (e.g., an HEU-type energy storage system and an HPU-type energy storage system) and are configured to deliver power to drive one or more wheels of an electric vehicle. The systems may be configured to implement various control strategies to achieve optimization of the energy and power consumption of the vehicle to meet various driving demands. In some embodiments, systems and methods are provided that connect multiple types of energy storage units (e.g., HEU batteries, HPU batteries, lithium-capacitor solutions, fuel cell systems, flow batteries, and/or ultracapacitor systems) to the powertrain system of the vehicle in various configurations to allow for various control strategies to be implemented. The systems and methods may be used in fully electric or partially-electric (e.g., hybrid) vehicles.

Some embodiments are directed to a powertrain system for a vehicle. The powertrain system comprises a first energy storage unit, a second energy storage unit, and an electronic control unit coupled to the first energy storage unit and the second energy storage unit. The first energy storage unit is configured to provide power to drive a first set of wheels of the vehicle. The second energy storage unit is configured to provide power to drive a second set of wheels of the vehicle different from the first set of wheels. In some embodiments, the first and second sets of wheels may be entirely different in that no common wheels are included in both the first and second sets. In some embodiments, the first and second sets may have common wheels. For example, the wheels in the first set are also included in the second set, whereas the second set includes wheels that are not included in the first set. The first and second energy storage units have different energy storage and/or energy discharge characteristics. For example, the first energy storage includes a high energy unit, whereas the second energy storage includes a high power unit. The electronic control unit is programmed to control a charge and/or a discharge operation of the first energy storage unit and the second energy storage unit.

Some embodiments are directed to a method for controlling operation of a powertrain system of any of the embodiments described above. The method comprises transmitting control signals to one or more of the first energy storage unit, the second energy storage unit, and/or other components of the system to control one or more operations thereof, to provide power to drive the first set of wheels and/or the second set of wheels, and/or to charge any of the first energy storage unit and the second energy storage unit from the first set and/or the second set of wheels by a regenerative braking system of the vehicle.

Some embodiments are directed to a powertrain system for a vehicle. The powertrain system includes: a first energy storage unit configured to provide power to drive a plurality of wheels of the vehicle; a second energy storage unit configured to provide power to drive the plurality of wheels of the vehicle; and a DC bus coupled between the first energy storage unit and the second energy storage unit. The DC bus is further coupled to the plurality of wheels of the vehicle, where the DC bus is configured to transfer energy between the plurality of wheels and any one of the first energy storage and the second energy storage units. The plurality of wheels may be a subset or a full set of active wheels that can be powered to drive the vehicle.

Some embodiments are directed to a method for controlling operation of a powertrain system of any of the embodiments described above. The method comprises: transmitting control signals to one or more of the first energy storage unit, the second energy storage unit, the DC bus, and/or other components of the system to control operations thereof, to provide power to drive the plurality of wheels, and/or to charge any of the first energy storage unit and the second energy storage unit from the plurality of wheels by a regenerative braking system of the vehicle.

BRIEF DESCRIPTION OF THE DRAWINGS

Additional embodiments of the disclosure, as well as features and advantages thereof, will become more apparent by reference to the description herein taken in conjunction with the accompanying drawings. The components in the figures are not necessarily to scale. Moreover, in the figures, like-referenced numerals designate corresponding parts throughout the different views.

DETAILED DESCRIPTION

Figure 1:
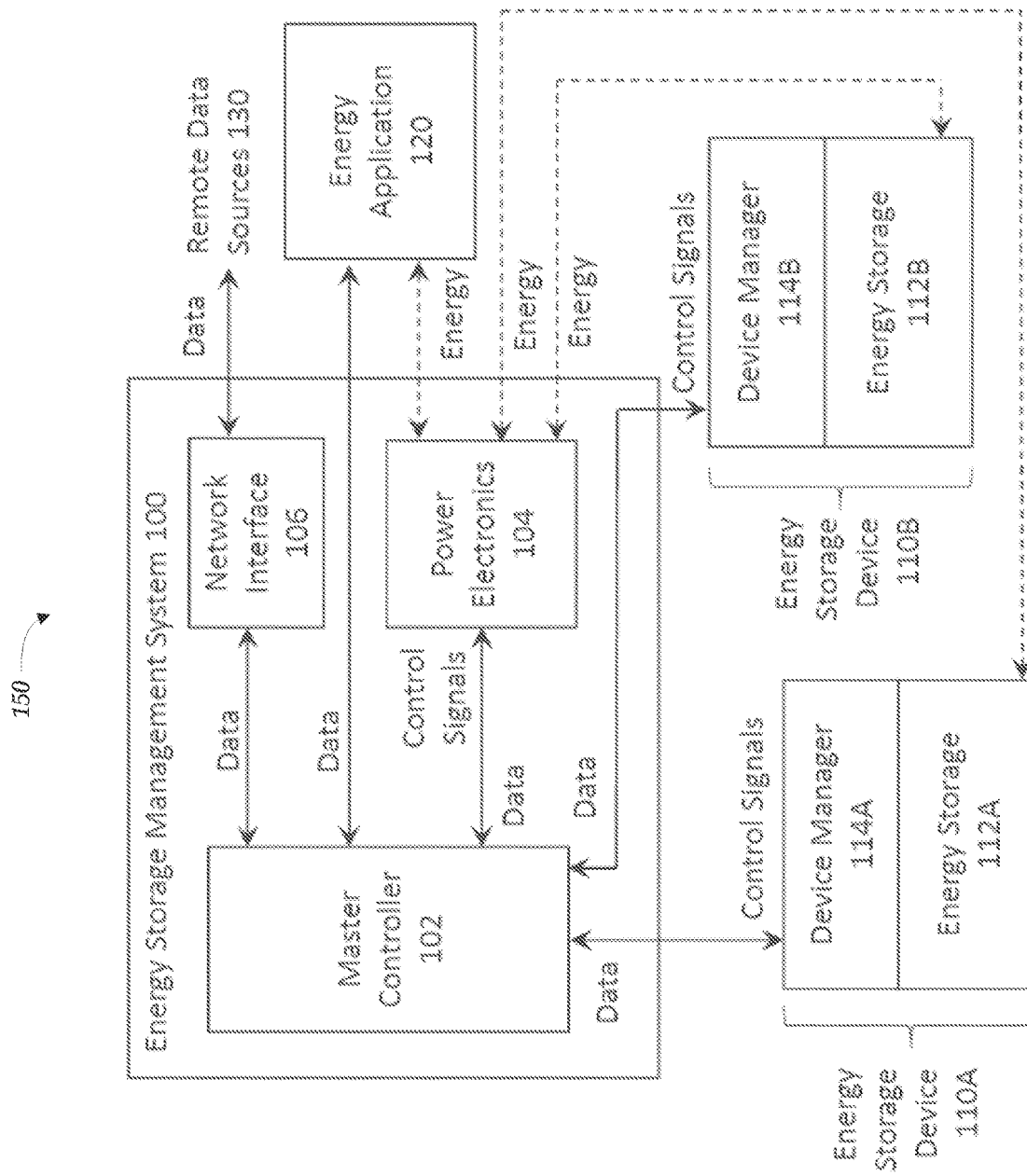
FIG. 1 shows an illustrative powertrain system, in accordance with some embodiments.

Energy storage systems are used as part of the powertrain in hybrid and electric vehicles to provide power to drive one or more wheels of the vehicle during driving. In dual energy storage systems, two types of energy storage units having different characteristics are used to provide power for the vehicle. For instance, a high energy storage unit (HEU) with a relatively high energy density (or specific energy) may be used in a dual energy storage system to meet power demand that is relatively steady, whereas an energy storage unit with a relatively high power density (or specific power) (referred to herein as an HPU) may be used in addition to, or instead of, the HEU when there is a spike in power demand. The use of dual energy storage systems in electric vehicles allows for optimization of the energy and power consumption of the vehicle to meet various driving demands. For example, a high performance vehicle may require instant high power output to the front or all wheels in an overtaking operation. In such scenario, the powertrain system may choose to use power provided from the HPU rather than the HEU to enable the vehicle to respond quickly and smoothly. In another scenario in which the user drives aggressively or erratically, the system may be configured to use power output from both HEU and HPU simultaneously, as needed, based on the power demand and energy conversion efficiency of the powertrain.

The inventors have recognized and appreciated that the complexity of the dual energy storage system (in terms of system design, control, and optimization of power and energy for accommodating various driving demands) and the risk of failure associated with the dual energy storage system (particularly in high performance vehicles) often limit the use of such systems in electric vehicles, such that most electric vehicles currently on the market use energy storage systems having a single battery chemistry type. For example, the inventors have recognized and appreciated that different manufacturers of energy storage units that may be used in a dual energy storage system, may configure the energy storage units to provide output power having a wide range of voltages, resulting in the two types of energy storage units used in the dual energy storage system having different output voltages. Additionally, these output voltages may, in some instances, also be different from the voltage required by other powertrain components that receive the energy provided by the energy storage units. Such voltage mismatches may complicate transferring energy from different types of energy storage units to other powertrain components used to drive the wheels of the vehicle.

The inventors have also recognized and appreciated that different sets of wheels of a vehicle may have different power requirements for providing desired or optimal overall performance of the vehicle. Further, the inventors have recognized and appreciated that a dual energy storage system may require additional components when compared with an energy storage system that only includes energy storage units of a single type. For example, a single DC-DC converter that may be needed to transfer energy between two energy storage units having power at different voltages may weigh as much as 13 kg, not to mention a system in which multiple DC-DC converters may be required for a dual energy storage system. A dual energy storage system may also require additional length of wiring, such as high voltage power transmission cables, thereby adding additional weight to the vehicle. The inventors have further recognized and appreciated that some dual energy storage systems may also require a more complex configuration, which may negatively impact efficient operation (e.g., charge/discharge operations) of the vehicle.

In some embodiments, powertrain configurations including a dual energy storage system are provided to enable various control strategies for controlling the powertrain of an electric vehicle to achieve a desired vehicle performance. For example, techniques are provided in which the respective one or more drivetrain components associated with different wheels of the vehicle are provided with different amounts of power from a dual energy storage system to achieve a desired or optimal performance for the vehicle. Accordingly, various embodiments provide for a powertrain system to deliver power from different types of energy storage units to different sets of wheels to achieve such a desired performance. In another example, techniques are provided in which different types of energy storage units providing energy having different voltages are used, without significantly increasing the weight of the vehicle which may negatively impact the energy efficiency of the vehicle. The weight reduction may be achieved in some embodiments, for example, by using a DC bus to deliver power from the different types of energy storage units to the wheels of the vehicle. Use of a DC bus reduces the length of wiring in comparison to the length that is required for running high voltage power transmission cables from energy storage units to the wheels of the vehicle individually for each type of energy storage unit.

Whereas various embodiments have been described, it will be apparent to those of ordinary skill in the art that many more embodiments and implementations are possible. Accordingly, the embodiments described herein are examples, not the only possible embodiments and implementations. Furthermore, the advantages described above are not necessarily the only advantages, and it is not necessarily expected that all of the described advantages will be achieved with every embodiment.

FIG. 1 shows an illustrative powertrain system 150, in accordance with some embodiments. The system may include energy storage management system 100, which may be used to manage energy storage units 110A and 110B to supply energy to, and/or receive energy from, an energy application 120. The energy application 120 may be any suitable energy application, such as a vehicle.

Examples of vehicles include, but are not limited to, land vehicles (e.g., cars, motorcycles, scooters, trams, trucks, etc.), watercrafts (e.g., boats, jet skis, hovercrafts, submarines, etc.), aircrafts (e.g., drones, helicopters, airplanes, etc.), and spacecrafts. In such examples, a vehicle may have any suitable number of wheels, such as two, three, four, eight, or other suitable number. It should be appreciated that a vehicle may fall within multiple ones of these categories. For instance, a seaplane may be both a watercraft and an aircraft. Additionally, some vehicles, such as trailers of semi-trucks, may have some wheels that are driven by the powertrain of the vehicle and other wheels that are passive and are not driven by the powertrain, but provide stability for the vehicle.

In some embodiments, the energy storage units 110A and 110B may be of different types. For instance, the energy storage unit 110A may have a higher energy density (or specific energy) compared to the energy storage unit 110B. Additionally, or alternatively, the energy storage unit 110B may have a higher power density (or specific power) compared to the energy storage unit 110A. Accordingly, the energy storage unit 110A and the energy storage unit 110B are sometimes referred to herein as a "high energy" device and a "high power" device, respectively. Thus, it should be appreciated that the terms "high energy" and "high power" are used in a relative sense, as opposed to an absolute sense.

In the example shown in FIG. 1, the energy storage unit 110A includes an energy storage 112A, and the energy storage unit 110B includes an energy storage 112B. In some embodiments, the energy storage 112A may include an electrochemical battery, whereas the storage 112B may include a supercapacitor. However, it should be appreciated that aspects of the present disclosure are not limited to using any particular energy storage technology or combination of energy storage technologies. In some embodiments, the energy storage 112A and 112B may both include electrochemical batteries, which may be of the same or different chemistry. In some embodiments, the energy storage 112A and 112B may both include supercapacitors, or other non-electrochemical energy storage units which may be of a same type or different types.

The energy storage 112A may be of any suitable construction. For instance, the energy storage 112A may use a liquid electrolyte, a solid electrolyte, and/or a polymer electrolyte. Moreover, the energy storage 112A may be a cell, a module, a pack, or another suitable unit that is individually controllable. Likewise, the energy storage 112B may be of any suitable construction, which may be the same as, or different from, the construction of the energy storage 112A. For instance, the energy storage 112B may use a liquid electrolyte, a solid electrolyte, and/or a polymer electrolyte. Moreover, the energy storage 112B may be a cell, a module, a pack, or another suitable unit that is individually controllable.

In some embodiments, one or both of the energy storage unit 110A and the energy storage unit 110B may include a device manager. For instance, in the example of FIG. 1, the energy storage unit 110A and the energy storage unit 110B include, respectively, device managers 114A and 114B. An example of a device manager is a battery management system (BMS) that is built into a smart battery pack.

In some embodiments, a device manager (e.g., the device manager 114A or the device manager 114B) may be configured to monitor one or more aspects of an associated energy storage (e.g., the energy storage 112A or the energy storage 112B). Examples of monitored aspects include, but are not limited to, current, voltage, temperature, state of charge (e.g., percentage charged), state of health (e.g., present capacity as a percentage of original capacity when the energy storage unit was new), etc. For instance, the device manager may include one or more sensors configured to collect data from the associated energy storage. Additionally, or alternatively, the device manager may include one or more controllers configured to process data collected from the associated energy storage.

In some embodiments, a device manager (e.g., the device manager 114A or the device manager 114B) may be configured to control an associated energy storage (e.g., the energy storage 112A or the energy storage 112B). For instance, the device manager may be configured to stop discharging of the associated energy storage in response to determining that a temperature of the associated energy storage has reached a selected threshold. Additionally, or alternatively, in an embodiment in which the associated energy storage includes a plurality of cells in series, the device manager may be configured to perform balancing, for example, by transferring energy from a most charged cell to a least charged cell.

In some embodiments, a device manager (e.g., the device manager 114A or the device manager 114B) may be configured to transmit data via a communication interface, such as a bus interface (e.g., Controller Area Network, or CAN), a wireless interface (e.g., Bluetooth), etc. For instance, the device manager may be configured to transmit data to a master controller 102 of the energy storage management system 100. Any suitable data may be transmitted, including, but not limited to, sensor data and/or one or more results of analyzing sensor data.

It should be appreciated that aspects of the present disclosure are not limited to using an energy storage unit with an associated device manager. In some embodiments, one or more sensors external to an energy storage unit may be used to monitor one or more aspects of the energy storage unit, such as current, voltage, temperature, state of charge (e.g., percentage charged), state of health (e.g., present capacity as a percentage of original capacity when the energy storage unit was new), etc.

In some embodiments, the master controller 102 may receive data from the energy application 120 in addition to, or instead of, the device manager 114A and/or the device manager 114B. For instance, the energy application 120 may provide data indicating how much power the energy application 120 is currently drawing or supplying. Additionally, or alternatively, the energy application 120 may provide environmental data such as weather (e.g., temperature, humidity, atmospheric pressure, etc.), traffic (in case of a vehicle), etc. Additionally, or alternatively, the energy application 120 may provide operational data such as speed (in case of a vehicle), CPU usage (in case of computing equipment), load weight (in case of a warehouse robot or a drone), etc.

Additionally, or alternatively, the master controller 102 may receive data from power electronics 104, which may include circuitry configured to distribute a demand (or supply) of power by the energy application 120 between the energy storage units 110A and 110B. For instance, the power electronics 104 may provide data indicating whether the energy application 120 is currently drawing or supplying power, how much power the energy application 120 is currently drawing or supplying, and/or how that power is distributed between the energy storage units 110A and 110B.

Additionally, or alternatively, the master controller 102 may receive data from one or more remote data sources 130. For example, the energy storage management system 100 may include a network interface 106 configured to establish a connection using a suitable networking technology (e.g., 5G, WiMax, LTE, GSM, WiFi, Ethernet, Bluetooth, etc.). Although only one network interface is shown in FIG. 1, it should be appreciated that aspects of the present disclosure are not so limited. In some embodiments, a plurality of network interfaces may be provided, which may be of the same type or different types. In some embodiments, no network interface may be provided, and the master controller 102 may receive data from a remote data source via the energy application 120.

Moreover, it should be appreciated that data may be received from any suitable remote data source. For instance, the energy application 120 may be a vehicle in a fleet of vehicles, and the master controller 102 may receive data from other vehicles in the fleet. Additionally, or alternatively, the master controller 102 may receive data from a cloud server that is monitoring and/or controlling the fleet.

In some embodiments, the master controller 102 may be configured to provide one or more control signals to the power electronics 104. For instance, the master controller 102 may be configured to analyze data received from the energy storage unit 110A, the energy storage unit 110B, the power electronics 104, the energy application 120, and/or the one or more remote data sources 130. Based on a result of the analysis, the master controller 102 may determine how a demand (or supply) of power by the energy application 120 should be distributed between the energy storage units 110A and 110B, and/or whether energy should be transferred from the energy storage unit 110A to the energy storage unit 110B, or vice versa. The master controller 102 may then provide one or more control signals to the power electronics 104 to effect the desired distribution of power and/or energy.

Although details of implementation are described above and shown in FIG. 1, it should be appreciated that aspects of the present disclosure are not limited to any particular manner of implementation. For instance, while two energy storage units (i.e., 110A and 110B) are shown in FIG. 1, it should be appreciated that aspects of the present disclosure are not limited to using any particular number of one or more energy storage units. In some embodiments, just one energy storage unit may be used, or three, four, five, etc. energy storage units may be used.

Figure 2A:
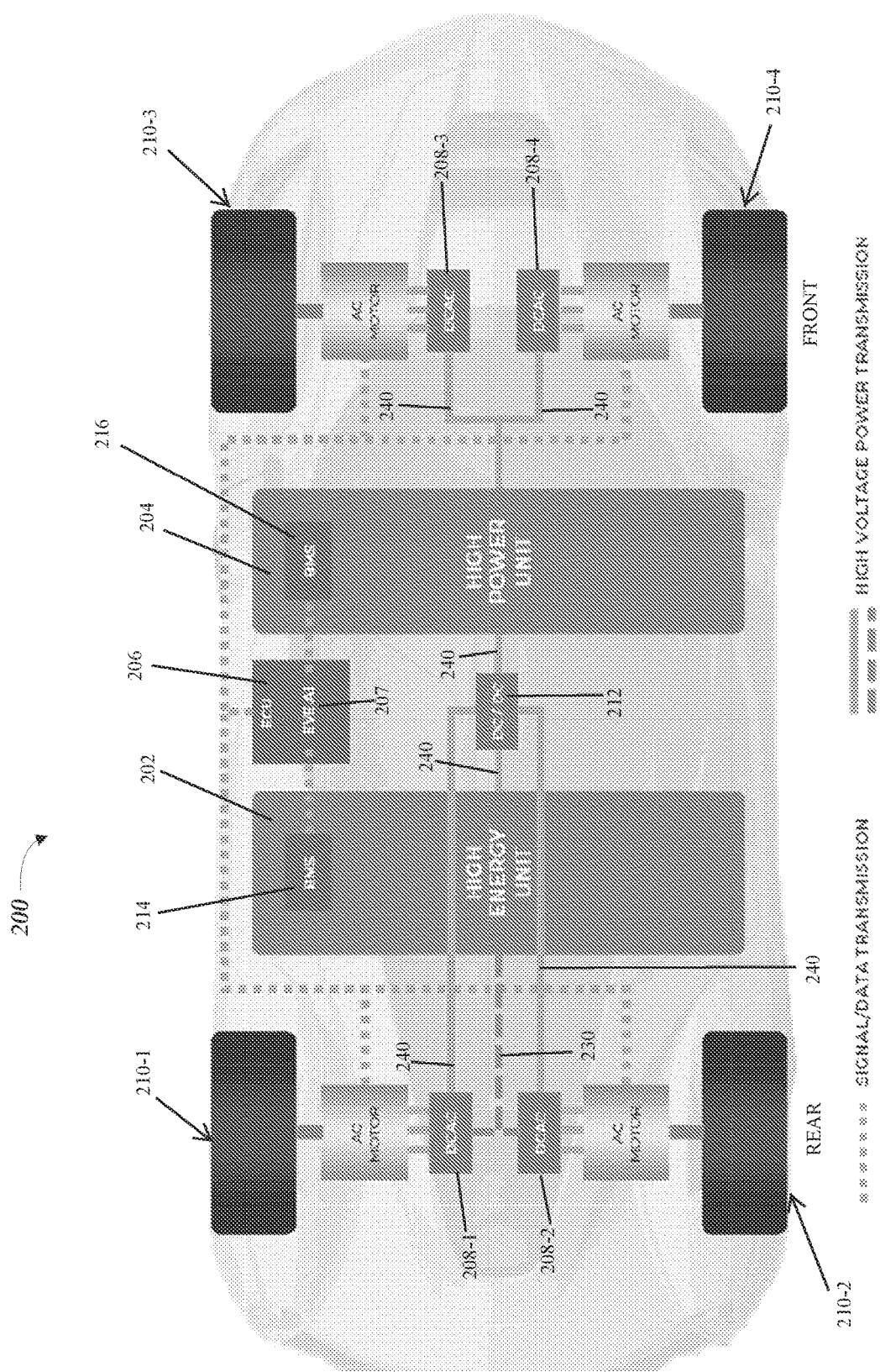
FIG. 2A shows an illustrative powertrain system comprising a first energy storage unit for providing power to a first set of wheels and a second energy storage unit for providing power to a second set of wheels, in accordance with some embodiments.

FIG. 2A shows an illustrative powertrain system 200 comprising a first energy storage unit 202 and a second energy storage unit 204, in accordance with some embodiments. The illustrative powertrain system 200 may be used to implement various techniques described in the powertrain system 150 (of FIG. 1) for a vehicle. In some embodiments, first energy storage 202 may be configured to provide power to drive a first set of wheels of the vehicle and second energy storage unit 204 may be configured to provide power to drive a second set of wheels of the vehicle that includes at least some wheels not included in the first set of wheels. The second energy storage unit 204 may have different energy storage and/or energy discharge characteristics than the first energy storage unit 202. For example, the first and second energy storage units 202, 204 may respectively include energy storage units 110A, 110B (of FIG. 1). In a non-limiting example, the first energy storage unit may include a high energy storage unit (HEU) and the second energy storage unit may include a high power unit (HPU).

As shown in FIG. 2A, each of the first energy storage unit 202 and second energy storage unit 204 may be coupled to a different set of wheels to provide power to drive the wheels. For example, the first energy storage unit 202 may be coupled to a first set of wheels and the second energy storage unit 204 may be coupled to a second set of wheels. In the configuration shown in FIG. 2A, the first set of wheels may be a subset of the second set of wheels. For example, the first set of wheels may include rear wheels, e.g., 210-1, 210-2. The second set of wheels may include all wheels, e.g., 210-1, 210-2, 210-3, 210-4. As such, the first energy storage unit 202 may be controlled to discharge energy to drive the rear wheels. In operation, the energy from the first energy storage unit 202 may be discharged through the high voltage power transmission line 230 to respective one or more drivetrain components associated with the rear wheels to provide power to drive the rear wheels.

In some embodiments, the one or more drivetrain components (e.g., 208-1, 208-2, 208-3, 208-4) associated with each wheel may include a DC-AC converter. In some embodiments, the DC-AC converter may convert a high DC voltage provided from the high voltage power transmission line 230 to an AC voltage to drive an AC motor associated with a respective wheel. In some embodiments, the one or more drivetrain components associated with each wheel may also include one or more components of a regenerative braking system. The regenerative braking system may be configured to generate charge during breaking of the vehicle, and provide the generated charge to the energy storage unit(s) to which the one or more components of the regenerative braking system are connected thereby providing charging of the energy storage unit(s).

In some configurations, the DC voltage output from an energy storage unit may be the same as the DC voltage required by respective one or more drivetrain components associated with one or more wheels with which the energy storage unit is coupled. For example, the DC voltage output from the energy storage unit 202 may be the same or substantially the same as the DC voltage required by the one or more drivetrain components (e.g., 208-1, 208-2) coupled to the energy storage unit 202. In such a configuration, a direct connection (e.g., without DC-DC conversion) between the one or more drivetrain components (e.g., 208-1, 208-2) and the energy storage unit 202, as shown in 230, may allow energy transfer between the energy storage unit 202 and the one or more drivetrain components.

In some other configurations, the DC voltage output from an energy storage unit may be different from the DC voltage required by respective one or more drivetrain components associated with one or more wheels with which the energy storage unit is coupled. For example, the energy storage unit 202 may be configured to provide a first DC voltage (e.g., 800V), the DC voltage required by the one or more drivetrain components (e.g., 208-1, 208-2) may be the same or substantially the same as the first DC voltage. The second energy storage unit 204 may be configured to provide a second DC voltage (e.g., 1100V) that is different than the first DC voltage. Some embodiments relate to powertrain configurations and techniques for allowing energy storage units that generate different DC voltages to provide power to drive the same wheels or different wheels in a desired manner.

With further reference to FIG. 2A, the second energy storage unit 204 may be coupled to the second set of wheels to provide power to drive the second set of wheels and/or to receive energy from the one or more drivetrain components associated with the second set of wheels. In a non-limiting example, the second set of wheels may include all wheels, e.g., 210-1, 201-2, 201-3, 210-4. The second set of wheels may include a subset of wheels, for example, a first subset (e.g., rear wheels 210-1, 210-2) and a second subset (e.g., front wheels 210-3, 210-4). In this case, the second set of wheels includes at least one or more wheels that are not included in the first set of wheels (e.g., front wheels 210-3, 210-4). In some embodiments, the second energy storage unit 204 may be coupled to one or more drivetrain components (e.g., 208-1, 208-2) of the first subset of wheels via a DC-DC converter 212 and high voltage power transmission line 240. In the example described above, the DC voltage required by the one or more drivetrain components (e.g., 208-1, 208-2) may be different from the DC voltage output from the second energy storage unit 204. In such case, the DC-DC converter 212 may be configured to switch between the two voltages. For example, converter 212 may be configured to convert a DC voltage output from the second energy storage unit to a DC voltage required by the one or more drivetrain components (e.g., 208-1, 208-2) associated with the first subset of the second set of wheels and/or convert a DC voltage output from these drivetrain components (e.g., 208-1, 208-2) to a DC voltage required by the second energy storage unit 204 for charging. In such a configuration, the second energy storage unit 204 may discharge energy to the first subset of the second set of wheels (e.g., rear wheels 210-1, 210-2) and/or receive energy from one or more second drivetrain components associated with those wheels to charge the second energy storage unit.

In some embodiments, the second energy storage unit 204 may be coupled to the one or more drivetrain components (e.g., 208-3, 208-4) of the second subset of the second set of wheels (e.g., front wheels 210-3, 210-4) via a high voltage power transmission line 240. The drivetrain components associated with the second subset of the second set of wheels (e.g., 210-3, 210-4) may be similar to those associated with the first set of wheels (e.g., 210-1, 210-2). For example, the one or more drivetrain components may each include an inverter (e.g., a DC-AC converter) to convert DC power to AC power to drive the AC motor associated with a respective wheel. Additionally, the one or more drivetrain components may each include one or more components of the regenerative braking system of the vehicle to generate power from a braking operation of the vehicle.

In some embodiments, the DC voltage output from the second energy storage unit 204 and the DC voltage required by the one or more drivetrain components (e.g., 208-3, 208-4) of the associated wheels (e.g., front wheels 210-3, 210-4) may be in the same range. In such case, the energy storage unit 204 may be directly coupled to the drivetrain components associated with the front wheels (without a DC-DC converter coupled in between) to facilitate energy transfer between the energy storage unit 204 and the drivetrain components and to reduce the weight of the vehicle. It is appreciated that the difference between the DC voltage output from the second energy storage unit 204 and the DC voltage required by the one or more drivetrain components (e.g., 208-3, 208-4) of the front wheels (e.g., 210-3, 210-4) may exceed a threshold voltage range, and accordingly, another DC-DC converter may be coupled between the second energy storage unit 204 and the drivetrain components (e.g., 208-3, 208-4) to convert the voltages.

With further reference to FIG. 2A, in some embodiments the first energy storage unit 202 and the second energy storage unit 202 are coupled to each other such that energy can be transferred between the two energy storage units (e.g., for charging one of the two energy storage units by the other one). As shown in FIG. 2A, the first energy storage unit 202 and the second energy storage unit 204 may be coupled to each other via the DC-DC converter 212. In such a configuration, the DC-DC converter 212 may be configured to convert the DC voltage output from the second energy storage unit 204 to a DC voltage required by the first energy storage unit 202 for charging. The DC-DC converter 212 may also be configured to convert a DC voltage received from the first energy storage 202 to a DC voltage required by the second energy storage unit 204 for charging.

In some embodiments, system 200 may further include an electronic control unit (ECU) 206 coupled to the first energy storage unit 202 and the second energy storage unit 204. In some embodiments, the ECU 206 may be programmed to control a timing of a charge and/or a discharge operation of the first energy storage unit 202 and the second energy storage unit 206. The ECU 206 may also be coupled to the one or more drivetrain components associated with the wheels and programmed to control the drivetrain components to provide power to drive the wheels and/or to control the drivetrain components to generate energy from the regenerative braking system of the vehicle. In some embodiments, each of the energy storage units (e.g., 202, 204) may include a respective battery management system (BMS), e.g., 214, 216. The BMS may receive control signals from the ECU 206 and perform one or more operations (e.g., charge, discharge operations). The BMS may also monitor the status of the corresponding energy storage unit (e.g., to ensure that it is operating within safety limits) and transfer status data back to the ECU 206. In turn, the ECU 206 may generate control signals accordingly based on the status of the energy storage unit. For example, the ECU 206 may monitor the state of charge (SOC) of the energy storage unit and determine whether to send a control signal to cause the energy storage unit to charge/discharge. Now, the operations of the powertrain system 200 are further explained with reference to FIGS. 2B and 2C.

Figure 2B:
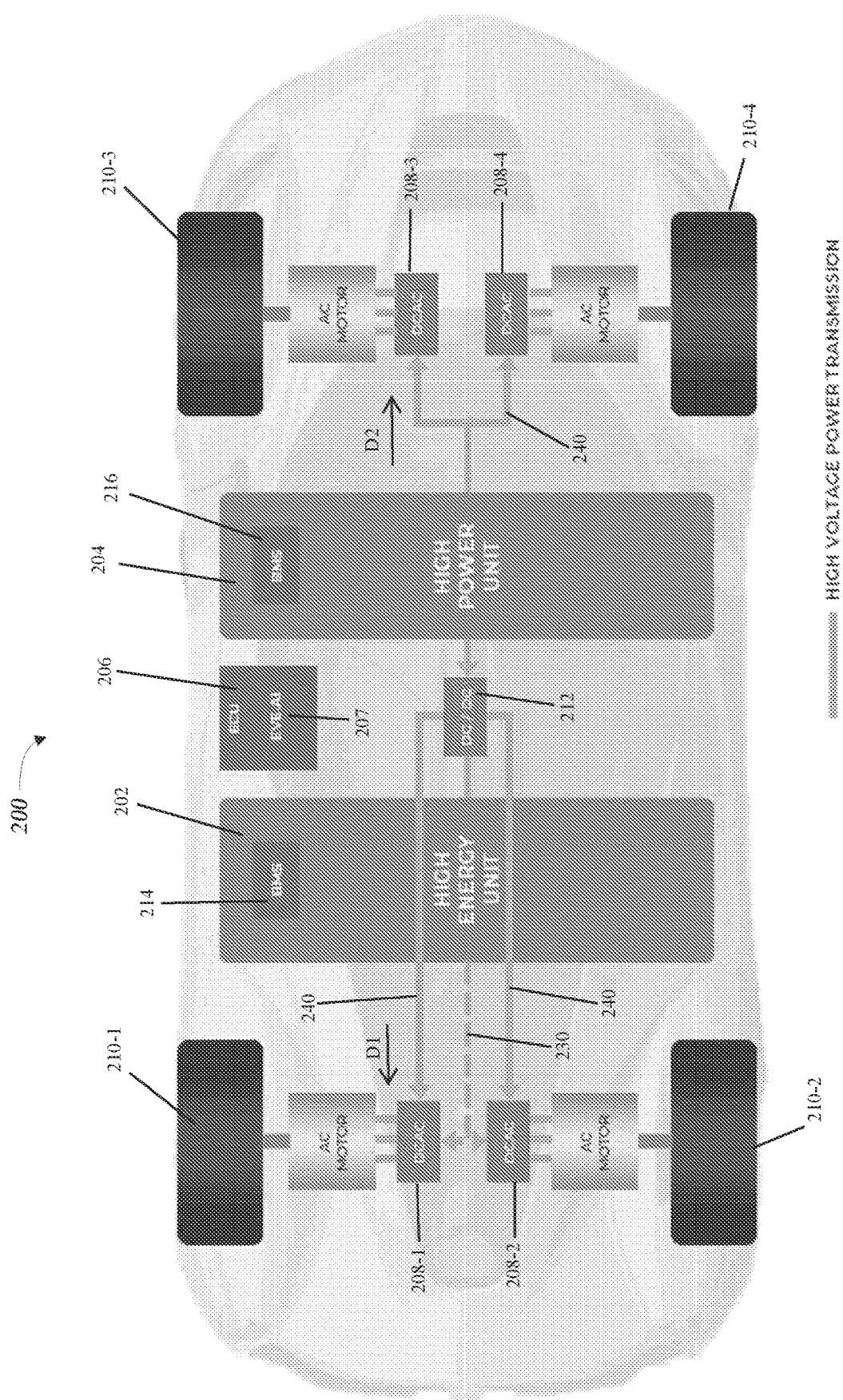
FIG. 2B shows energy transfer in the illustrative powertrain system in FIG. 2A in a discharge mode, in accordance with some embodiments.

FIG. 2B shows energy transfer in the illustrative powertrain system 200 in FIG. 2A in a discharge mode, in accordance with some embodiments. The powertrain system may operate in various modes, for example, a discharge mode, a regeneration mode, or any other mode or a combination thereof. In some embodiments, when the powertrain system 200 is operating in a discharge mode, one or more of the energy storage units of the system may be configured to be discharged by providing energy to drive one or more wheels. In some embodiments, the powertrain system may be configured to operate in the discharge mode when the vehicle needs power, such as when the vehicle accelerates (starts moving or speeds up) or when the vehicle cruises to maintain a constant speed. In the example configuration shown in FIG. 2B, when the powertrain system operates in the discharge mode, the energy may flow from the first energy storage unit 202 to the first set of wheels (e.g., 210-1, 210-2). In operation, the first energy storage unit 202 may provide energy to respective one or more drivetrain components (e.g., 208-1, 208-2) associated with the first set of wheels (e.g., 210-1, 210-2), along the high voltage power transmission line 230 in direction D1, to drive the wheels.

Additionally, and/or alternatively, when the powertrain system is operating in the discharge mode, the energy may also flow from the second energy storage unit 204 to the first subset of the second set of wheels (e.g., 210-1, 210-2). In operation, the second energy storage unit 204 may provide energy to respective one or more drivetrain components (e.g., 208-1, 208-2) associated with the wheels (e.g., 210-1, 210-2) along the high voltage power transmission line 240 to drive those wheels. As shown in FIG. 2B, the DC-DC converter 212 may operate in a first direction and be configured to convert the DC voltage received from the second energy storage unit 204 to a DC voltage required by the one or more drivetrain components associated with the rear wheels (e.g., 210-1, 210-2). This allows energy to flow from the second energy storage unit 204 to the one or more drivetrain components associated with the rear wheels in direction D1 to drive these wheels.

Additionally, and/or alternatively, when the powertrain system is operating in the discharge mode, the energy may flow from the second energy storage unit 204 to the front wheels (e.g., 210-3, 210-4). In operation, the second energy storage unit 204 may provide energy to respective one or more drivetrain components (e.g., 208-3, 208-4) associated with the front wheels (e.g., 210-3, 210-4) in direction D2 along the high voltage power transmission line 240 to drive the front wheels. As shown in FIG. 2B, the DC voltage output from the second energy storage unit 204 may be the same as the DC voltage required by one or more drivetrain components (e.g., 208-3, 208-4). As such, the second energy storage unit 204 may transfer energy directly to these drivetrain components without needing a DC-DC converter.

Figure 2C:
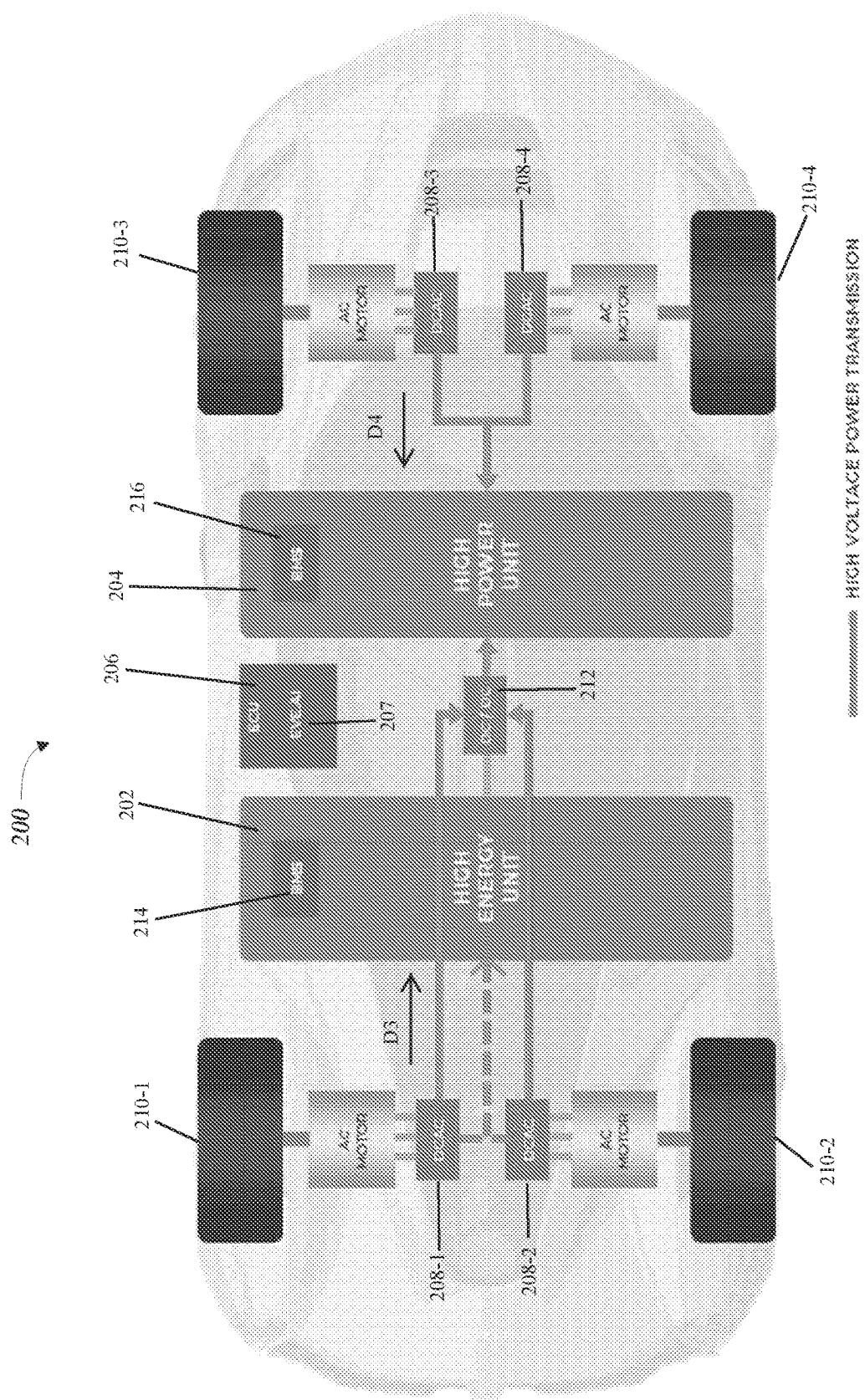
FIG. 2C shows energy transfer in the illustrative powertrain system in FIG. 2A in a regeneration mode, in accordance with some embodiments.

FIG. 2C shows energy transfer in the illustrative powertrain system 200 in FIG. 2A in a regeneration mode, in accordance with some embodiments. When the powertrain system 200 is operating in the regeneration mode, one or more of the energy storage units of the system may be configured to be charged through a regenerative braking system during the operation of the vehicle. In some embodiments, the powertrain system may be configured to operate in the regeneration mode when the vehicle performs a braking operation. In such operation, one or more components of regenerative braking system of the vehicle may convert the vehicle's kinetic energy generated by the braking operation to energy that can be used to charge one or both of the energy storage units. In the example configuration shown, when the powertrain system is operating in the regeneration mode, energy may flow from one or more drivetrain components associated with the rear wheels (e.g., 210-1, 210-2) to one or more of the energy storage units 202, 204. The drivetrain components may include one or more components of a regenerative braking system of the vehicle and be configured to generate energy from the braking operation. The system may transfer the generated energy to the first energy storage unit 202 in direction D3 (opposite to direction D1) along the high voltage power transmission line 230 to charge the first energy storage unit 202.

Additionally, and/or alternatively, when the powertrain system is operating in the regeneration mode, energy may also flow from the one or more drivetrain components associated with the first subset of the second set of wheels (e.g., rear wheels 210-1, 210-2) to the second energy storage unit 204. In operation, the one or more drivetrain components (e.g., 208-1, 208-2) associated with the rear wheels may provide energy to the second energy storage unit 204 in direction D3 along the high voltage power transmission line 240 to charge the second energy storage unit 204. As shown in FIG. 2C, the DC-DC converter 212 may operate in a second direction and be configured to convert the DC voltage received from the one or more drivetrain components of the rear wheels to a DC voltage required by the second energy storage unit 204 for charging. This allows the energy to flow from the drivetrain components associated with the rear wheels (e.g., 210-1, 210-2) to the second energy storage unit 204. As shown in FIGS. 2B and 2C, the DC-DC converter 212 may be configured to operate in two directions (respectively in discharge and regeneration modes). In some embodiments, a bi-directional DC-DC converter may be used, where the bi-directional DC-DC may be configured to convert voltages in two directions. In other embodiments, two uni-directional DC-DC converters may be used, with each performing the voltage conversion in a single direction. Other variations may also be possible. For instance, in some embodiments, only a single unidirectional DC-DC converter may be used for providing power from an energy storage unit to one or more drivetrain components when charging using regenerative braking is not provided for that energy storage unit.

Additionally, and/or alternatively, when the powertrain system is operating in the regeneration mode, energy may flow from the second subset of the second set of wheels (e.g., front wheels 210-3, 210-4) to the second energy storage unit 204. In operation, the one or more drivetrain components (e.g., 208-3, 208-4) associated with the front wheels (e.g., 210-3, 210-4) may generate energy from the braking operation and transfer the energy to the second energy storage unit 204 along the high voltage power transmission line 240 to charge the second energy storage unit 204. As shown in FIG. 2C, the DC voltage received from the one or more drivetrain components (e.g., 208-3, 208-4) may be in the same range as the DC voltage required by the second energy storage unit 204 for charging. As such, the drivetrain components associated with the front wheels (e.g., 210-3, 210-4) may transfer energy to the second energy storage unit 204 directly in direction D4 (opposite to direction D2) without needing a DC-DC converter.

With reference to FIGS. 2B and 2C, in some embodiments, the powertrain system may control the first energy storage unit 202 and the second energy storage unit 204 to allow energy flow between the two energy storage units. This energy flow may occur when the system is operating in the discharge mode. For example, with reference to FIG. 2B, in the discharge mode, energy from the second energy storage unit 204 may additionally flow to the first energy storage unit 202 in direction D1 to charge the first energy storage unit 202. In operation, the DC-DC converter 212 may be configured to convert the DC voltage received from the second energy storage unit 204 to a DC voltage required by the first energy storage unit 202 for charging. In some embodiments, the energy flow between the energy storage unit 202, 204 may occur when the system is operating in the regeneration mode. For example, with reference to FIG. 2C, in the regeneration mode, energy from the first energy storage unit 202 may additionally/alternatively flow to the second energy storage unit 204 in direction D3 to charge the second energy storage unit 204. In operation, the DC-DC converter 212 may be configured to convert the DC voltage received from the first energy storage unit 204 to a DC voltage required by the second energy storage unit 204 for charging.

In some embodiments, the energy flow between the energy storage unit 202, 204 may occur when the system is operating in any state other than the discharge or regeneration modes. For example, the vehicle may be operating in a cruising mode when none of the wheels requires power. In such case, the powertrain system may be configured to balance the charges in the first and second energy storage units 202, 204 by transferring energy from the first energy storage unit to the second energy storage unit to charge the second energy storage unit and/or transferring energy from the second energy storage unit to the first energy storage unit to charge the first energy storage unit. In such case, the DC-DC converter may operate in a similar manner as in the discharge mode or the regeneration mode.

As discussed above, the connection between the first and second energy storage units 202, 204 allows one energy storage system to charge the other throughout the driving cycle. This gives additional control to the ECU 206 to manage the power output from each energy storage unit to respective drivetrain components, and the power output from each energy storage unit to other energy storage units. The DC/DC converter is configured to manage the voltage mismatch between the first and second energy storage units 202, 204 to allow them to share energy between each other. This configuration also facilitates various control strategies to be used to optimize power and energy control of the system. For example, the ECU 206 may be configured to make a control decision in anticipation of heavy regenerative braking or acceleration, to ensure both energy storage units 202, 204 are at the optimal state of charge (SOC) for the future load. In a non-limiting example, the power demand at a time instance may be 100 kW. The system may control the power sharing to be appropriated at 70 kW to be supplied by the first energy storage unit (e.g., HEU) to the rear wheels, 30 kW to be supplied by the second energy storage unit (e.g., HPU) to the front wheels, and 5 kW to be supplied by the HPU to the HEU. Such energy sharing decision results in the HEU having a net discharge of 65 kW, and the HPU having a net discharge of 35 kW at the time instance. Alternatively or additionally, the system may be configured to control the HEU to be operating under a constant net discharge, which will result in an extended operating life of the energy storage unit.

The various embodiments described above with reference to FIGS. 2A-2C may be advantageous in that a balance of safety and control may be achieved in the operation of the vehicle. The control is enabled by the coupling of the different types of energy storage units (e.g., HEU 202, HPU 204), which facilitates various control strategies as will be described. The DC-DC converter (e.g., 212) for voltage regulation improves the safety of the system against self-discharge. For example, without the DC-DC converter, energy may flow between the HEU and HPU by voltage differential (e.g., from high voltage to low voltage) in an unintended manner, which increases a risk of self-discharge of the energy storage units.

The various embodiments described above with reference to FIGS. 2A-2C may implement various control strategies in optimizing the power and energy of the system while meeting performance requirements from vehicle operations. In some embodiments, the various control strategies may be implemented in the ECU 206. For example, ECU 206 may include one or more processors and the control strategies may include programming instructions which, when executed by the one or more processors, may cause the ECU to send control signals to control the energy storage units (e.g., 202, 204). Additionally, and/or alternatively, the programming instructions implementing the control strategies may also be executed in another processing unit internal or external (e.g., via a communication network) to the vehicle.

By way of example, exemplary control strategies that may be implemented in the system 200 are further described. In some embodiments, the powertrain system 200 may be operating in a discharge mode when the vehicle is cruising. In such mode, the energy demand is minimal and can be supplied by the HEU (e.g., 202), which may be controlled to provide power to rear wheels only. If the HPU (e.g., 204) is discharged or at a low SOC level, the HEU may be controlled to transfer energy to the HPU to keep the HPU ready for any upcoming demands that may require performance (e.g., in acceleration situation).

In other scenarios, such as overtaking scenario described previously in the present disclosure, the ECU 206 may control the HEU (e.g., 202) and HPU (e.g., 204) to provide instant high power output to the front or all wheels to provide the needed power so that the vehicle can respond quickly and smoothly. In another scenario in which the user drives aggressively or erratically, the system may choose to use both HEU and HPU simultaneously, as needed, based on the power demand and energy conversion efficiency of the powertrain.

In some embodiments, when the system is operating in the regeneration mode (e.g., when the driver is applying braking to the vehicle), the kinetic energy from braking may be converted by a regenerative braking system of the vehicle to energy that may be used to charge energy storage units. For example, in the powertrain configuration shown in FIGS. 2A-2C, HPU (e.g., 204) is coupled to all wheels (e.g., 210-1 to 210-4). This configuration allows most of the energy generated at the front wheels to be transferred to the HPU (e.g., 204). In some embodiments, the HPU (e.g., 204) may have a high power regain capability (compared with HEU, e.g., 202). Thus, the ECU 206 may monitor the SOC level of the HPU 204. The ECU 206 may determine that HPU 204 still has capacity to accept regenerative energy in response to determining that the SOC level of the HPU 204 is below a threshold level. In some embodiments, the SOC level of the HPU 204 may be obtained by the BMS (e.g., 216) of the HPU 204. Once the ECU 206 determines that the HPU has capacity to accept the regenerative energy, the ECU may control the system to charge the HPU through the regenerative braking system.

In some embodiments, the ECU 206 may use a recommendation system (e.g., driving velocity algorithm) to analyze all braking situations and control the HPU to prepare the HPU for all those situations by transferring energy from HPU (e.g., discharging HPU) to keep the HPU in a state that is ready to accept regenerative energy (in a future braking operation, for example). In some embodiments, the ECU may, based on HPU capacity and predicted energy conversion efficiency of the powertrain, control the system to send all of the energy regenerated from all wheels to HPU (e.g., 204). Additionally, and/or alternatively, the ECU may control the HPU to draw energy from front wheels while the HEU is being charged from rear wheels.

Figure 3:
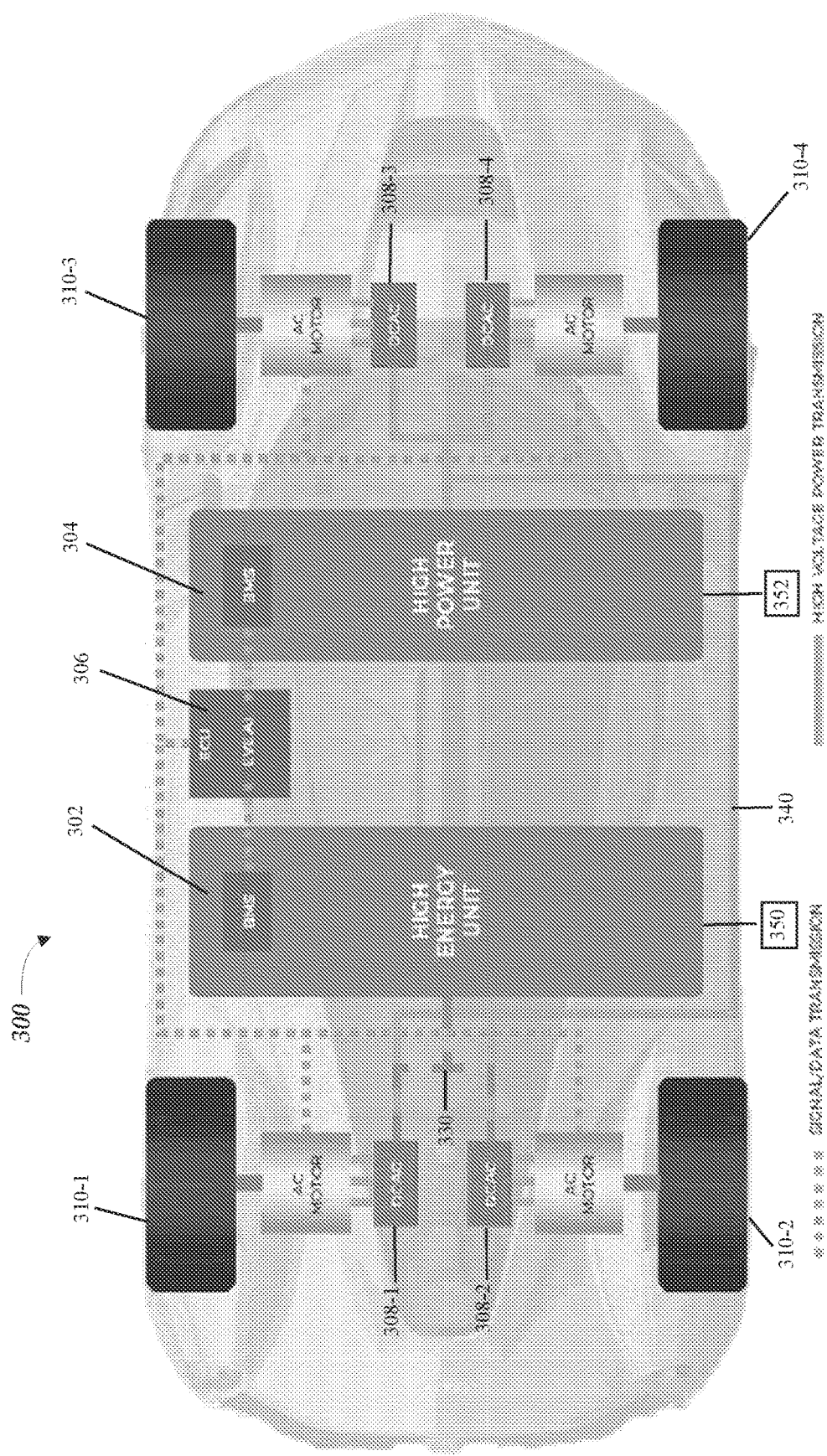
FIG. 3 shows an illustrative powertrain system comprising a first energy storage unit for providing power to a first set of wheels and a second energy storage unit isolated from the first energy storage unit and configured to provide power to a second set of wheels, in accordance with some embodiments.

FIG. 3 shows a variation of an illustrative powertrain system 300 comprising a first energy storage unit 302 for providing power to a first set of wheels and a second energy storage unit 304 being isolated from the first energy storage unit and being configured to provide power to a second set of wheels, in accordance with some embodiments. The illustrative powertrain system 300 may be used to implement various techniques described in the powertrain system 150 (of FIG. 1) for a vehicle. In some embodiments, powertrain system 300 may be configured in a similar manner as system 200 (FIGS. 2A-2C), except that the first energy storage unit 302 and the second energy storage unit 304 are isolated from each other (e.g., by not including a DC-DC converter between the two energy storage units. In this configuration, the first energy storage unit 302 may be coupled to the first set of wheels (e.g., rear wheels 310-1, 310-2) directly by the high voltage power transmission line 330. The second energy storage unit 304 may be coupled to the second set of wheels (e.g., front and rear wheels) directly by high voltage power transmission line 340. Such a configuration may be suitable when the first energy storage unit 302 and the second energy storage unit 304 both provide similar DC voltages that are within an acceptable voltage differential of the voltage required by the one or more drivetrain components associated with the respective first and second sets of wheels. Energy may flow between the first energy storage unit 302 and the rear wheels or between the second energy storage unit 304 and front and rear wheels without requiring a DC-DC converter, thereby reducing the vehicle weight and also improving energy efficiency in the system compared to the configuration shown for system 200. Furthermore, because the first energy storage unit 302 and the second energy storage unit 304 are not directly connected, self-discharge risk associated with the energy storage units (e.g., when a DC-DC converter fails) may be reduced.

In some embodiments, system 300 may operate in a similar manner as system 200 (FIGS. 2A-2C), except that there is no energy flow between the first energy storage unit 302 and the second energy storage unit 304. For example, when system 300 is operating in the discharge mode, the first energy storage unit 302 may be configured to provide energy through the high voltage power transmission line 330 to the one or more drivetrain components (e.g., 308-1, 308-2) associated with the rear wheels (e.g., 310-1, 310-2) to drive the rear wheels. Similarly, the second energy storage unit 304 may be configured to provide energy through the high voltage power transmission line 340 to the one or more drivetrain components (e.g., 308-1, 308-2, 308-3, 308-4) associated with front and rear wheels to drive the front and rear wheels.

In some embodiment, when system 300 is operating in the regeneration mode, one or more components of a regenerative braking system of the vehicle may be configured to generate energy from a braking operation of the vehicle and transfer the energy to the first energy storage unit 302 or the second energy storage unit 304. For example, energy may be provided from one or more drivetrain components (e.g., 308-1, 308-2) associated with the rear wheels (e.g., 310-1, 310-2) through the high voltage power transmission line 330 to the first energy storage unit 302 to charge the first energy storage unit 302. Similarly, energy may be provided from one or more drivetrain components (e.g., 308-1, 308-2, 308-3, 308-4) associated with front and rear wheels through the high voltage power transmission line 340 to the second energy storage unit 304 to charge the second energy storage unit 304.

In some embodiments, similar to system 200, system 300 may also include an electronic control unit 306 coupled to the first and second energy storage units 302, 304, and/or respective one or more drivetrain components associated with the wheels, where the electronic control unit may be programmed to send control signals to these components to control one or more operations thereof. Similar to system 200, each of the first energy storage unit 302 and second energy storage unit 304 may include a respective battery management system coupled to the electronic control unit 306 to monitor the respective energy storage unit, receive control signals, and/or control the operation of the respective energy storage unit.

In some examples, system 300 may include separate charging circuits for the first energy storage unit 302 and the second energy storage unit 304. For example, system 300 may include a first charging circuit 350 coupled to the first energy storage unit 302 and configured to charge the first energy storage unit from a power source. System 300 may also include a second charging circuit 352 coupled to the second energy storage unit 304 and configured to charge the second energy storage unit from a power source (e.g., the same power source used for the first charging circuit or a different power source). For example, a first port and a second port each coupled respectively to the first and second charging circuits may be coupled to the power source to draw energy from the power source. The power source may be external to the vehicle, such as an outlet or an electric car charging station. The power source may also be internal to the vehicle and configured to be active during the operation of the vehicle. For example, the power source may be a regenerative braking system of the vehicle that may be configured to generate power during braking of the vehicle.

Embodiments that use the powertrain configuration shown in FIG. 3 may provide advantages relative to the powertrain configuration described with reference to FIGS. 2A-2C in reduced vehicle weight and improved energy efficiency (because no DC-DC converted is needed). Further, the different types of energy storage units (e.g., 302, 304) may be configured to provide different DC voltages depending on the SOC levels and power demands of these energy storage units. When a voltage mismatch exists, self-discharge as a result of involuntary exchange of energy between the energy storage units may be reduced because there is no direct connection between the energy storage units (for example, there is no direct connection between energy storage units 302, 304).

The various embodiments described above with reference to FIG. 3 may implement various control strategies in optimizing the power and energy of the system while meeting performance requirements from vehicle operations. For example, the powertrain configuration shown in FIG. 3 may implement similar control strategies as described for embodiments that implement the powertrain configurations shown in FIGS. 2A-2C. Additionally, and/or alternatively, the system 300 may control the HPU (e.g., 304) to be used conservatively because there is no connection between the HEU (e.g., 302) and HPU (e.g., 304) to allow energy flow between the two. For example, the ECU 306 may be configured to control the system to draw energy from the HPU (e.g., 304) only for driving demands that require high power, acceleration, and/or traction, while conserving the HPU energy in other situations. In those other situations, the ECU 306 may control the HEU to provide energy required for normal driving to the rear wheels (e.g., 310-1, 310-2).

In some embodiments, a control strategy in a regeneration mode may include a priority to keep the HPU (e.g., 304) fully charged by charging as much energy as possible to the HPU (e.g., 304) via the regenerative braking system. Similar to other control strategies described above, the ECU 306 may be configured to monitor the SOC level of the HPU (e.g., 304) and, based on the monitoring, determine whether the HPU can accept regenerative energy. If the ECU 306 determines that the HPU can accept regenerative energy, the ECU may send control signals to control the HPU to be charged in the regeneration mode. The control strategy described herein allows minimal to no plug-in charging for HPU (e.g., 304), whereas only HEU (e.g., 302) may need to be charged over plug-in charging stations. As can be seen, this control strategy may eliminate the need for a separate charging circuit for the HPU, while allowing the HPU to be charged mostly from regenerative energy.

Figure 4:
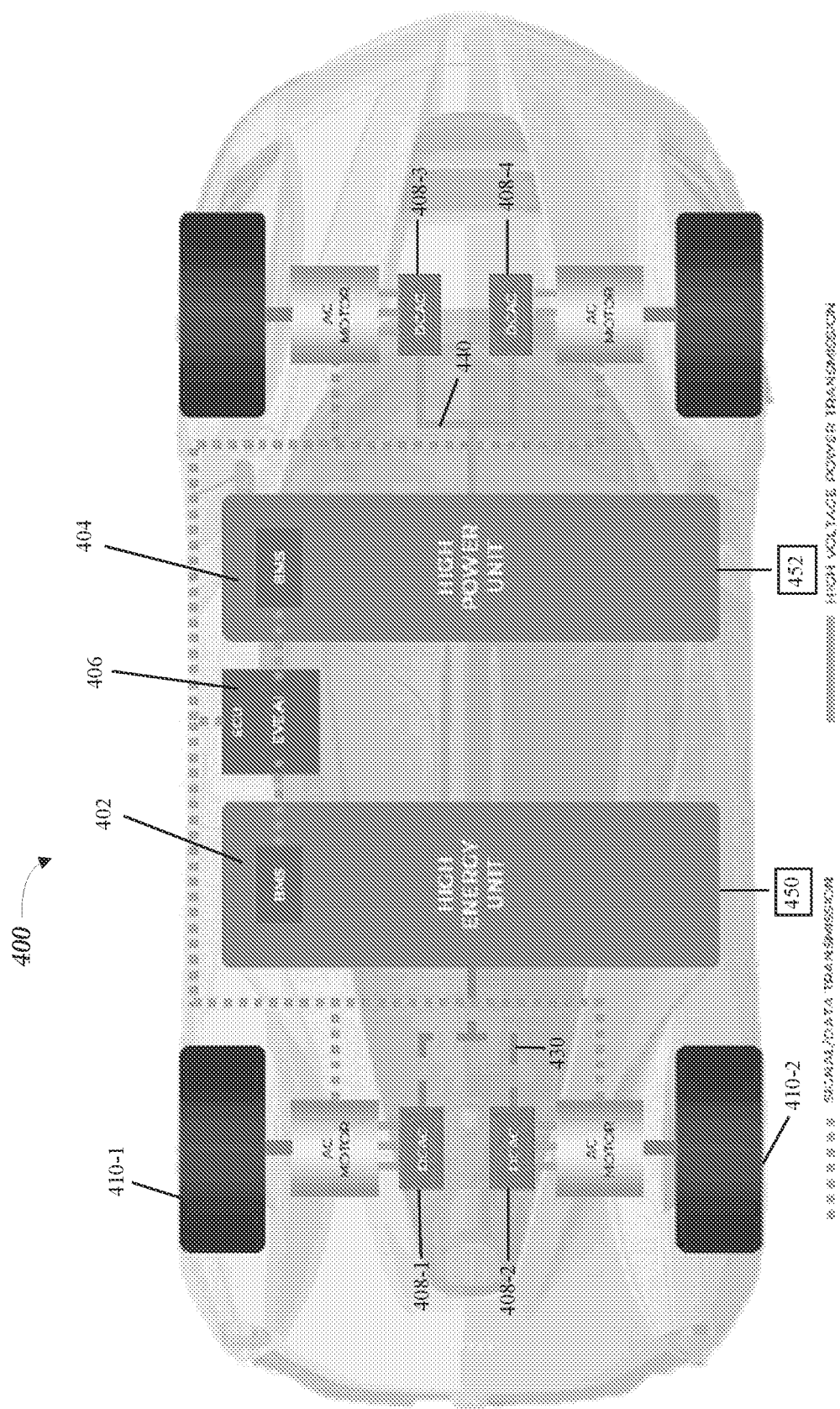
FIG. 4 shows an illustrative powertrain system comprising a first energy storage unit for providing power to a first set of wheels and a second energy storage unit isolated from the first energy storage unit and configured to provide power to a second set of wheels, where the first and second sets of wheels are mutually exclusive, in accordance with some embodiments.

FIG. 4 shows another variation of an illustrative powertrain system 400 comprising a first energy storage unit 402 configured to provide power to a first set of wheels and a second energy storage unit 404 that is isolated from the first energy storage unit and configured to provide power to a second set of wheels, where the first and second sets of wheels are mutually exclusive, in accordance with some embodiments. The illustrative powertrain system 400 may be used to implement various techniques described in the powertrain system 150 (of FIG. 1) for a vehicle. In some embodiments, powertrain system 400 may be configured in a similar manner as system 300 shown in FIG. 3, except that the first set of wheels and the second set of wheels are mutually exclusive (i.e., there are no wheels common to both first and second set). For example, the first set of wheels may include rear wheels (e.g., 408-1, 408-2), and the second set of wheels may include front wheels (e.g., 408-3, 408-4). In such case, the first energy storage unit 402 may be coupled to the one or more drivetrain components of the rear wheels directly by high voltage power transmission line 430. The second energy storage unit 404 may be coupled to the one or more drivetrain components of the front wheels directly by high voltage power transmission line 440.

The configuration in system 400 may be suitable when the one or more drivetrain components associated with different wheels may require different input DC voltages, and the first energy storage unit 402 and the second energy storage unit 404 may provide those different DC voltages. In such case, each of the energy storage units in the system may be configured to drive a respective set of wheels. For example, the input DC voltage for the one or more drivetrain components associated with the rear wheels may be in a different range as the input DC voltage for the one or more drivetrain components associated with the front wheels. This may be the case for high performance vehicles in which the drivetrain components for the front (or rear) wheels may need much higher voltage as input than the drivetrain components for the other set of the wheels. In such high performance vehicles, system 400 enables each energy storage unit to provide energy to a separate set of wheels depending on the power requirement of the wheels. Each energy storage unit may also be charged from the regenerative braking system independently, or alternatively, only one of the energy storage units may be charged using energy generated from regenerative braking.

As can be appreciated, in comparison to system 300, the configuration in system 400 eliminates the need for a DC-DC converter and other transmission lines and circuitry for providing energy from multiple energy storage units to the same set of wheels simultaneously (for example, in FIG. 3, both energy storage units 302, 304 provide energy to the rear wheels 310-1, 310-2, resulting in extra length of high voltage power transmission cables). Thus, relative to system 300, the powertrain configuration in system 400 may provide advantages in reduced vehicle weight and improved energy efficiency in the system. Furthermore, because the first energy storage unit 302 and the second energy storage unit 304 are not directly connected, self-discharge risk associated with the energy storage units may be reduced. It is appreciated that the powertrain configuration of system 400 may also be used when the input DC voltage required by the one or more drivetrain components associated with the rear wheels is in a similar range as the input DC voltage required by the one or more drivetrain components associated with the front wheels.

In some embodiments, system 400 may operate in a similar manner as system 300 shown in FIG. 3, except that each set of wheels may be provided with energy discharged from a separate energy storage unit. For example, when system 400 is operating in the discharge mode, the first energy storage unit 402 may be configured to provide energy through the high voltage power transmission line 430 to the one or more drivetrain components associated with the rear wheels to drive the rear wheels. Similarly, the second energy storage unit 404 may be configured to provide energy through the high voltage power transmission line 440 to the one or more drivetrain components associated with the front wheels to drive the front wheels. When system 400 is operating in the regeneration mode, one or more components of a regenerative braking system of the vehicle may be configured to generate energy and transfer the energy to the first energy storage unit 402 or the second energy storage unit 404. For example, energy may be generated and transferred from the one or more drivetrain components associated with the rear wheels through the high voltage power transmission line 430 to the first energy storage unit 402 to charge the first energy storage unit. Similarly, energy may be generated and transferred from the one or more drivetrain components associated with the front wheels through the high voltage power transmission line 440 to the second energy storage unit 404 to charge the second energy storage unit.

In some embodiments, similar to various embodiments in FIGS. 2A-2C and FIG. 3, system 400 may also include an electronic control unit 406 coupled to the first and second energy storage units 402, 404, and/or respective one or more drivetrain components associated with the wheels, where the electronic control unit may be programmed to send control signals to these components to control the operations thereof. Each of the first energy storage unit 402 and second energy storage unit 404 may include a respective battery management system coupled to the electronic control unit 406 to receive control signals, monitor the status and control the operation of the respective energy storage unit.

In some embodiments, similar to system 300, system 400 may include separate charging circuits for the first energy storage unit 402 and the second energy storage unit 404. For example, system 400 may include a first charging circuit 450 coupled to the first energy storage unit 402 and configured to charge the first energy storage unit from a power source. System 400 may also include a second charging circuit 452 coupled to the second energy storage unit 404 and configured to charge the second energy storage unit from the power source. The power source may be external or internal to the vehicle, as described in the embodiments for system 300.

The various embodiments described above with reference to FIG. 4 may implement various control strategies in optimizing the power and energy of the system while meeting performance requirements from vehicle operations. For example, the powertrain configuration shown in FIG. 4 may implement similar control strategies as described in connection with embodiments that implement the powertrain configuration shown in FIG. 3. Because the HEU (e.g., 402) and the HPU (e.g., 404) are isolated in system 400, the control strategy may be versatile in that the HEU (e.g., 402) and HPU (e.g., 404) may be configured to provide different voltages to different sets of wheels. As such, the system 400 may provide maximum efficiency for both the HEU and HPU (402, 404). In the regeneration mode, the system may configured to transfer as much energy as possible from each set of wheels (e.g., front wheels or rear wheels) to respective energy storage units (e.g., HEU 402, HPU 404) to which the corresponding drivetrain components are coupled without requiring prioritization of energy storage units for charging as described above.

Figure 5:
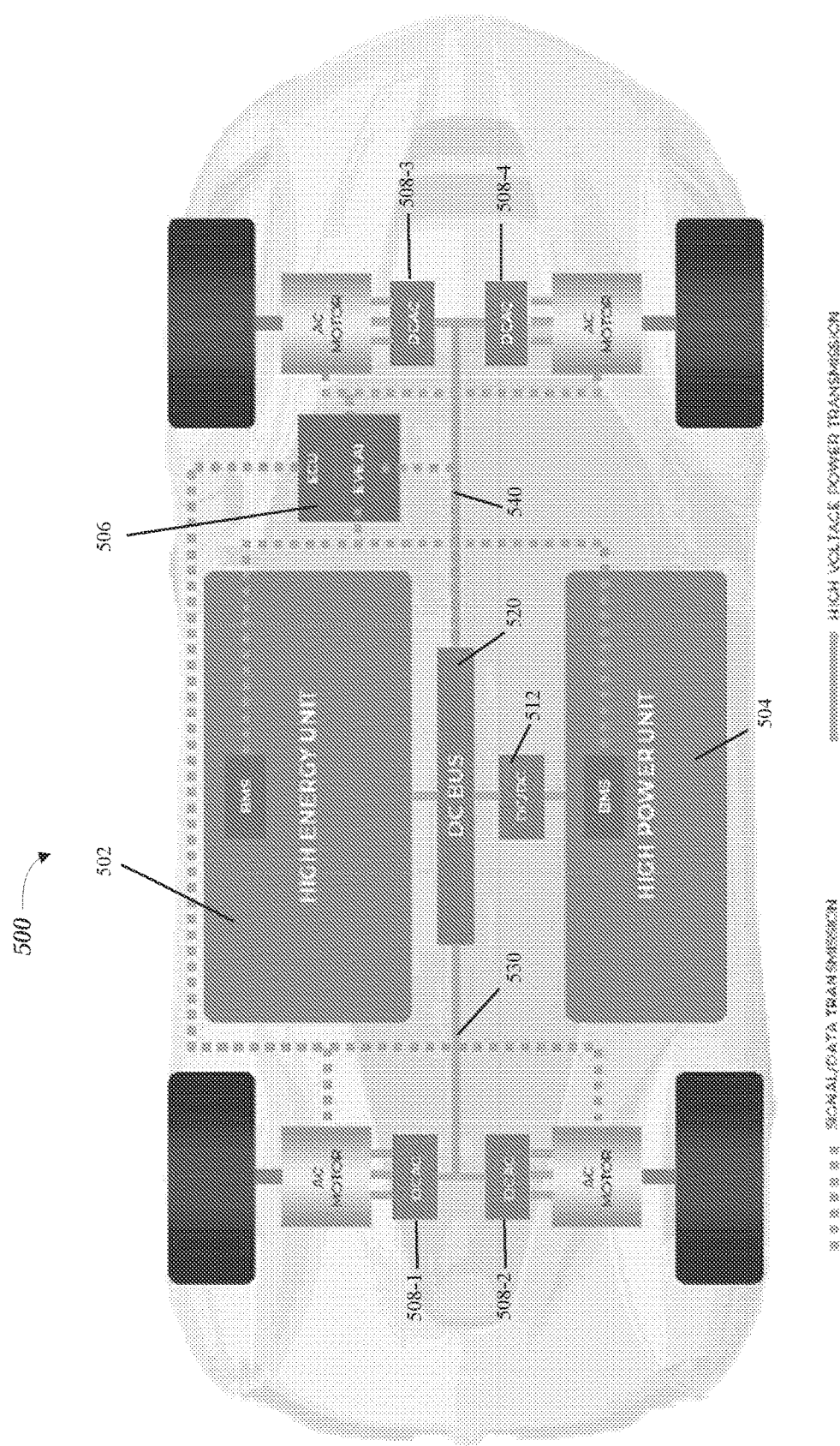
FIG. 5 shows an illustrative powertrain system comprising a first energy storage unit and a second energy storage unit, a DC bus and a DC-DC converter, in accordance with some embodiments.

FIG. 5 shows another variation of an illustrative powertrain system 500 comprising a first energy storage unit 502 and a second energy storage unit 504, a DC bus 520 and a DC-DC converter 512, in accordance with some embodiments. The illustrative powertrain system 500 may be used to implement various techniques described in the powertrain system 150 (of FIG. 1) for a vehicle. In some embodiments, powertrain system 500 may include a first energy storage unit 502 configured to provide energy to drive a plurality of wheels of the vehicle, a second energy storage unit 504 configured to provide energy to drive the plurality of wheels of the vehicle, and a DC bus 520 coupled between the first energy storage unit and the second energy storage unit.

Similar to energy storage units 202, 204, 302, 304, 402, 404, the first and second energy storage units 502, 504 may have different energy storage and/or energy discharge characteristics. For example, the first and second energy storage units 502, 504 may include energy storage units 110A, 110B (of FIG. 1). In a non-limiting example, the first energy storage unit 502 may include a high energy storage unit and the second energy storage unit 504 may include a high power unit. The DC bus may further be coupled to the plurality of wheels via high voltage power transmission lines 530, 540 and configured to transfer energy between the plurality of wheels and any one of the first energy storage 502 and the second energy storage units 504.

In some embodiments, the plurality of wheels may be a subset (i.e., less than all) of the wheels of the vehicle or may include all wheels of the vehicle. The DC bus 520 may transfer energy at an operating voltage and the input voltage required by the one or more drivetrain components associated with the plurality of wheels that are connected to the DC bus may be the same as or within an acceptable voltage differential of the operating voltage of the DC bus.

Figure 6:
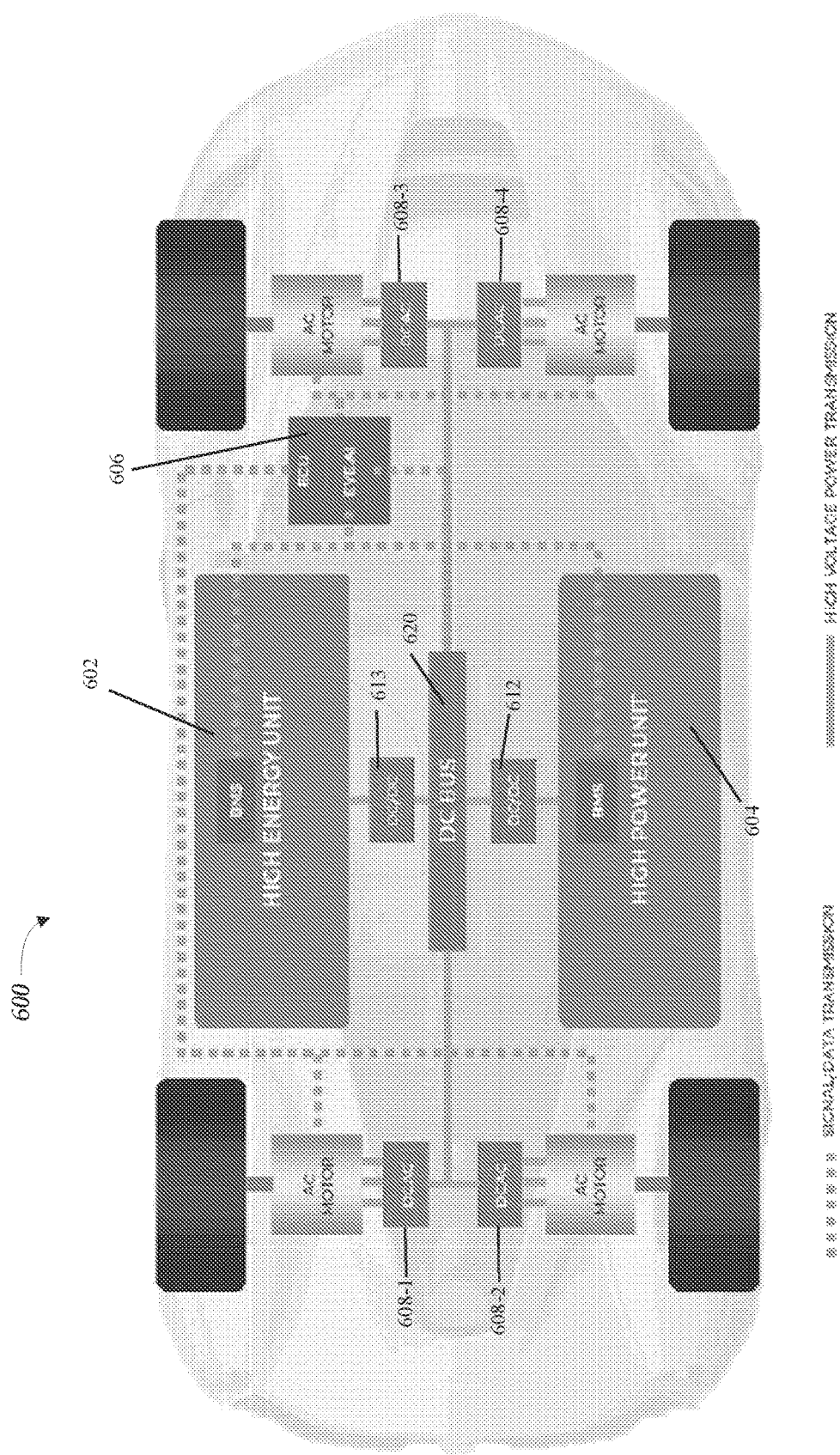
FIG. 6 shows an illustrative powertrain system comprising a first energy storage unit and a second energy storage unit, a DC bus, and two DC-DC converters, in accordance with some embodiments.

In some embodiments, the first and second energy storage units 502, 504 may each provide a DC voltage in a similar range as or within a different range from that of the operating voltage of the DC bus 520. For example, the first energy storage unit 502 may provide a DC voltage in a similar range as that of the operating voltage of the DC bus 520, whereas the second energy storage unit 504 may provide a DC voltage in a different range (e.g., higher or lower) from that of the operating voltage of the DC bus 520. In a non-limiting example, the DC bus 520 may be operating at a first DC voltage (e.g., 800V), the first energy storage unit 502 may provide a DC voltage that is the same or substantially the same as the first DC voltage. The second energy storage unit 504 may provide a second DC voltage (e.g., 1100V) that is different from the first DC voltage. In another example, the DC bus may be operating at a first DC voltage (e.g., 800V), whereas both the first and second energy storage units 502, 504 may provide a second DC voltage (e.g., 1100V) that is different from the first DC voltage. Accordingly, the configurations described in FIGS. 5 and 6 show some variations of the powertrain system to allow energy flow between the DC bus and an energy storage unit (e.g., 502, 504).

In some embodiments, with reference to FIG. 5, system 500 may additionally include a DC-DC converter 512 coupled between the DC bus 520 and the second energy storage unit 504. The DC-DC converter 512 may be configured to convert a DC voltage output from the energy storage unit 504 to an operating DC voltage of the DC bus and/or convert the operating DC voltage of the DC bus to a DC voltage required by the energy storage unit 504 for charging. The configuration shown in FIG. 5 may be suitable for a system where the first energy storage unit 502 provides a DC voltage in a similar range as that of the operating voltage of the DC bus 512, whereas the second energy storage unit 504 provides a DC voltage in a different range from that of the operating voltage of the DC bus 512. In the example described above, where the DC voltage provided by the energy storage unit 502 and the operating voltage of the DC bus 512 are the same or substantially the same (e.g., 800V) and the energy storage unit 504 provides a different DC voltage (e.g., 1100V), the DC-DC converter 512 may be configured to convert voltages in a first direction (e.g., from 800V to 1100V) or in a second direction (e.g., from 1100V to 800V).

The above described configuration of system 500 may operate in the discharge mode and the regeneration mode as described above for other powertrain configurations. In some embodiments, when the powertrain system is operating in the discharge mode, the DC bus is configured to transfer energy directly from the energy storage unit 502 to the respective one or more drivetrain components associated with each of the plurality of wheels (e.g., all wheels). The DC bus may also transfer energy from energy storage unit 504 to the respective one or more drivetrain components associated with each of the plurality of wheels via the DC-DC converter 512. In operation, the DC-DC converter 512 may convert a DC voltage output from the energy storage unit 504 to an operating DC voltage of the DC bus 512.

In some embodiments, when the powertrain system is operating in the regeneration mode, the DC bus 520 may transfer energy from the respective one or more components associated with each of the plurality of wheels (e.g., all wheels) to the energy storage unit 502. The DC bus may also transfer energy from the respective one or more components associated with each of the plurality of wheels to the energy storage unit 504 via the DC-DC converter 512. As similarly described above, the DC-DC converter 512 may be configured to operate in a different direction than that in the discharge mode by converting the operating DC voltage of the DC bus 512 to a DC voltage required by the energy storage unit 504 for charging.

Similar to other embodiments described above, system 500 may include an electronic control unit 506 coupled to the first and second energy storage units 502, 504, and/or respective one or more drivetrain components associated with the wheels (e.g., all wheels), where the electronic control unit may be programmed to send control signals to these components to control one or more operations thereof. Similar to other embodiments described above, each of the energy storage units 502, 504 may include a respective battery management system coupled to the electronic control unit 506 to receive control signals, monitor the respective energy storage unit and/or control the operation of the respective energy storage unit.

As shown in FIG. 5, system 500 may provide some advantages relative to other powertrain configurations in that improved safety may be achieved because the same voltage is provided to respective one or more drivetrain components associated with each of the plurality of wheels (e.g., there is no self-discharge risk). Further, because power is transferred to the wheels through the DC bus regardless of the source (e.g., energy storage unit 502 or energy storage unit 504), the system weight may be reduced as a result of less high voltage power transmission cabling being required. More control of power distribution among the motors associated with the wheels may also be achieved.

FIG. 6 shows a variation of an illustrative powertrain system 600 comprising a first energy storage unit 602 and a second energy storage unit 604, a DC bus, 620 and two DC-DC converters 612, 613, in accordance with some embodiments. The illustrative powertrain system 600 may be used to implement various techniques described in the powertrain system 150 (of FIG. 1) for a vehicle. In some embodiments, powertrain system 600 may be similar to system 500. As such, components that are similarly labelled in systems 500 and 600, for example, energy storage units 502/602, 504/604, DC bus 520/620, DC-DC converter 512/612, and respective one or more drivetrain components of the wheels (e.g., 508-xx/608-xx) may be similar and may operate in a similar manner. Additionally, system 600 may include a second DC-DC converter 613 coupled between the energy storage unit 602 and the DC bus 620. In such a configuration, the DC-DC converter 613 may convert a DC voltage output from the energy storage unit 602 to an operating DC voltage of the DC bus and/or convert the operating DC voltage of the DC bus to a DC voltage required by the energy storage unit 602 for charging. Such a configuration allows energy to be transferred between the energy storage unit 602 and the respective one or more drivetrain components associated with each of the plurality of wheels through the DC bus and DC-DC converter 613. Such a configuration also allows the DC voltage output from the energy storage unit 602 to be different from the operating DC voltage of the DC bus 620.

In some embodiments, similar to system 500, system 600 may also be configured to operate in the discharge mode or the regeneration mode, as previously described in the present disclosure. System 600 may also operate in a similar manner as system 500, except that the energy transfer between the energy storage unit 602 and the plurality of wheels is made through DC-DC converter 613 instead of via a direct connection.

Similar to other embodiments described above, system 600 may include an electronic control unit 606 coupled to the first and second energy storage units 602, 604, and/or respective one or more drivetrain components associated with the wheels (e.g., all wheels), where the electronic control unit may be programmed to send control signals to these components to control the operations thereof. Similar to other embodiments described above, each of the energy storage units 602, 604 may include a respective battery management system coupled to the electronic control unit 606 to receive control signals, monitor the respective energy storage unit, and control the operation of the respective energy storage unit.

As can be appreciated, the powertrain configuration of system 600 may allow for more flexibility in energy storage unit control scenarios compared to other powertrain configurations described herein. For example, the configuration in system 600 may allow the DC bus to be operating at any voltage that may be the same as or different from the DC voltage output from any of the energy storage units 602, 603.

The embodiments described above with reference to FIGS. 5 and 6 may implement various control strategies in optimizing the power and energy of the system while meeting performance requirements from vehicle operations. For example, as shown in FIGS. 5 and 6, each of systems 500, 600 allows both energy storage units (e.g., HEU 502/602, HPU 504/604) to provide energy to all wheels. Accordingly, a control strategy may include using either or both energy storage units 502/602, 504/604. For example, in a mixed driving situation, which includes both highway and city driving in one trip, the ECU (e.g., 506, 606) may be configured to control discharge of the HEU and HPU together until the SOC level of the HPU is below a low threshold (e.g., at a state in which the battery is empty and needs recharging). If the ECU determines that the SOC level of the HPU (e.g., 506, 606) is below the low threshold, the HPU may be controlled to be charged from regeneration and not provide any energy to drive the wheels.

In some embodiments, when the system 500/600 is operating in the regeneration mode, similar control strategies as described in for the powertrain configuration of system 300 may be implemented. Additionally, and/or alternatively, if the design of the system is such that the HPU (e.g., 504/604) can be recharged at plug-in charging stations much faster than the HEU (e.g., 502/602), then the system may give higher priority to HEU than HPU for receiving regenerative energy generated by the braking operation of the vehicle, while discharging the HPU for operations that require high power. In such a control strategy, the HPU may be used for power demanding operations only, which results in less overall energy discharge from the HPU. When such an HPU requires charging, the HPU can be charged quickly at a plug-in charging station. The HEU may be given higher priority to receive regenerative energy from braking operation of the vehicle, thus, the HEU may require less frequent charging from a plug-in charging station. Such a control strategy results in a reduced charging time at charging stations, which improves the user's experience with the vehicle.

In various embodiments described in FIGS. 1-6, methods may be implemented (e.g., in respective electronic control units of the embodiments in FIGS. 2A-6) to control operations of the powertrain system. The methods may transmit control signals to any of the one or more energy storage units, the DC-bus, respective one or more drivetrain components associated with the plurality of wheels, and/or one or more DC-DC converters to control operations thereof.

Various inventive concepts may be embodied as one or more methods, of which examples have been provided. The acts performed as part of a method may be ordered in any suitable way. Accordingly, embodiments may be constructed in which acts are performed in an order different than illustrated, which may include performing some acts simultaneously, even though shown as sequential acts in illustrative embodiments.

Some embodiments are directed to a powertrain system for a vehicle, the powertrain system comprising: a first energy storage unit configured to provide power to drive a first set of wheels of the vehicle; a second energy storage unit configured to provide power to drive a second set of wheels of the vehicle different from the first set of wheels, wherein the second energy storage unit has different energy storage and/or energy discharge characteristics than the first energy storage unit; and an electronic control unit coupled to the first energy storage unit and the second energy storage unit and programmed to control a charge and/or a discharge operation of the first energy storage unit and the second energy storage unit.

In some embodiments, the first energy storage unit comprises a high energy storage unit and the second energy storage unit comprises a high power unit.

In some embodiments, the second set of wheels of the vehicle comprise at least one or more wheels not included in the first set of wheels of the vehicle.

In some embodiments, the first energy storage unit is coupled to the first set of wheels and is configured to discharge energy to drive the first set of wheels and/or receive energy from one or more first drivetrain components associated with the first set of wheels to charge the first energy storage unit. The second energy storage unit is coupled to the second set of the wheels and is configured to discharge energy to the second set of wheels and/or receive energy from one or more second drivetrain components associated with the second set of wheels to charge the second energy storage unit.

In some embodiments, each of the one or more first drivetrain components and the one or more second drivetrain components respectively comprises one or more components of a regenerative braking system.

In some embodiments, the system further comprises a DC-DC converter coupled between the second energy storage unit and the one or more components associated with the first set of wheels. The DC-DC converter is configured to: convert a DC voltage output from the second energy storage unit to a DC voltage required by the one or more first drivetrain components associated with the first set of wheels and/or convert a DC voltage output from the one or more first drivetrain components associated with the first set of wheels to a DC voltage required by the second energy storage unit for charging.

In some embodiments, the DC-DC converter is a bi-directional DC-DC converter. The DC-DC converter configured to: convert the DC voltage output from the second energy storage unit to the DC voltage required by the one or more first drivetrain components associated with the first set of wheels in a first direction. The DC-DC converter is also configured to convert the DC voltage output from the one or more first drivetrain components associated with the set of wheels to the DC voltage required by the second energy storage unit for charging in a second direction.

In some embodiments, the DC-DC converter is configured to: operate in the first direction when the powertrain system is operating in a first mode; and operate in the second direction when the powertrain system is operating in a second mode.

In some embodiments, the first mode is a discharge mode and the second mode is a regeneration mode.

In some embodiments, the DC-DC converter is coupled between the first energy storage unit and the second energy storage unit and is configured to convert a DC voltage output from the second energy storage unit to a DC voltage required by the first energy storage unit for charging and/or convert a DC voltage output from the first energy storage to a DC voltage required by the second energy storage unit for charging.

In some embodiments, the first energy storage unit is configured to simultaneously: discharge energy to drive the first set of wheels; and discharge energy to the second energy storage unit to charge the second energy storage unit.

In some embodiments, the second energy storage unit is configured to simultaneously: discharge energy to drive the second set of wheels; and discharge energy to the first energy storage unit to charge the first energy storage unit.

In some embodiments, the first energy storage unit is configured to operate under a constant net discharge.

In some embodiments, the electronic control unit is configured to: determine a state of charge level of the second energy storage unit; and in response to determining that the state of charge level of the second energy storage unit has exceeded a threshold level: transfer energy from the first energy storage unit to the second storage energy unit to charge the second storage unit; and/or transfer regenerative energy generated from a braking operation of the vehicle to the second storage energy unit to charge the second storage unit.

In some embodiments, the first energy storage unit and the second energy storage unit are configured to output power having different voltages.

In some embodiments, the first energy storage unit and the second energy storage unit are configured to output power having a same voltage.

In some embodiments, the electronic control unit is configured to discharge the second storage unit to discharge energy to the second set of wheels in response to a driving demand that requires high power, acceleration and/or traction.

In some embodiments, the electronic control unit is configured to control the first energy storage unit to receive regenerative energy at a first priority and control the second energy storage unit to receive the regenerative energy at a second priority higher than the first priority, wherein the regenerative energy is generated from a braking operation of the vehicle.

In some embodiments, the first set of wheels of the vehicle and the second set of wheels of the vehicle are mutually exclusive.

In some embodiments, the first energy storage unit is coupled to the first set of wheels and is configured to discharge energy to drive the first set of wheels and/or receive energy from one or more drivetrain components associated with the first set of wheels to charge the first energy storage unit; and the second energy storage unit is coupled to the second set of the wheels and is configured to discharge energy to the second set of wheels and/or receive energy from one or more drivetrain components associated with the second set of wheels to charge the second energy storage unit.

In some embodiments, the first energy storage unit and the second energy storage unit are configured to output power having different voltages.

In some embodiments, the system further comprises: a first charging circuit coupled to the first energy storage unit and configured to charge the first energy storage unit from a first power source; and a second charging circuit coupled to the second energy storage unit and configured to charge the second energy storage unit from a second power source.

In some embodiments, the first power source and/or the second power source each is external to the vehicle.

In some embodiments, the first power source and/or the second power source each is internal to the vehicle and configured to be active during operation of the vehicle.

In some embodiments, the first power source and/or the second power source each is a regenerative braking system.

In some embodiments, the first energy storage unit comprises a first battery management system coupled to the electronic control unit, wherein the first battery management system is configured to receive first commands from the electronic control unit to perform charge/discharge operations of the first energy storage unit; and the second energy storage unit comprises a second battery management system coupled to the electronic control unit, wherein the second battery management system is configured to receive second commands from the electronic control unit to perform charge/discharge operations of the second energy storage unit.

Some embodiments a method for controlling operation of a powertrain system of any of embodiments described above. The method comprises: transmitting control signals to one or more of the first energy storage unit, the second energy storage unit, and/or the DC-DC converter to control one or more operations thereof.

Some embodiments a powertrain system for a vehicle. The powertrain system comprises: a first energy storage unit configured to provide power to drive a plurality of wheels of the vehicle; a second energy storage unit configured to provide power to drive the plurality of wheels of the vehicle; and a DC bus coupled between the first energy storage unit and the second energy storage unit, wherein the DC bus is further coupled to the plurality of wheels of the vehicle, and wherein the DC bus is configured to transfer energy between the plurality of wheels and any one of the first energy storage and the second energy storage units.

In some embodiments, the first energy storage unit is configured to provide a first voltage and the second energy storage unit is configured to provide a second voltage different from the first voltage.

In some embodiments, the DC bus is configured to: receive energy from respective one or more components associated with each of the plurality of wheels to the first and/or second energy storage units; and/or transfer energy from the first and/or second energy storage units to the respective one or more components associated with each of the plurality of wheels to drive the plurality of wheels.

In some embodiments, the DC bus is configured to transfer energy from the first and/or second energy storage units to the respective one or more drivetrain components associated with each of the plurality of wheels when the powertrain system is operating in a first mode.

In some embodiments, the DC bus is further configured to transfer energy from the respective one or more components associated with each of the plurality of wheels to the first and/or second energy storage units when the powertrain system is operating in a second mode.

In some embodiments, the first mode is a discharge mode and the second mode is a regeneration mode.

In some embodiments, the system further comprises: a first DC-DC converter coupled between the second energy storage unit and the DC bus, wherein the first DC-DC converter is configured to: convert a DC voltage output from the second energy storage unit to an operating DC voltage of the DC bus and/or convert the operating DC voltage of the DC bus to a DC voltage required by the second energy storage unit for charging.

In some embodiments, the operating DC voltage of the DC bus is the first voltage.

In some embodiments, the first energy storage unit comprises a high energy storage unit and the second energy storage unit comprises a high power storage unit.

In some embodiments, the system further comprises: a second DC-DC converter coupled between the first energy storage unit and the DC bus, wherein the second DC-DC converter is configured to: convert a DC voltage output from the first energy storage unit to an operating DC voltage of the DC bus and/or convert the operating DC voltage of the DC bus to a DC voltage required by the first energy storage unit for charging.

In some embodiments, the operating DC voltage of the DC bus is different from the first and second voltages.

In some embodiments, the system further comprises an electronic control unit coupled to the first energy storage unit, the second storage unit, and the DC bus, wherein the electronic control unit is configured to control the DC bus, charge/discharge operation of the first energy storage unit and charge/discharge operation of the second energy storage unit.

In some embodiments, the electronic control unit is configured to: simultaneously discharge energy from the first energy storage unit and the second energy storage unit to provide power to drive the plurality of wheels of the vehicle; monitor a state of charge level of the second energy storage unit; and in response to determining that the state of charge level of the second energy storage unit has exceeded a threshold level: suspend discharging the second energy storage unit; and transfer regenerative energy generated from a braking operation of the vehicle to the second energy storage unit.

In some embodiments, the the electronic control unit is configured to: control the first energy storage unit to receive regenerative energy at a first priority and control the second energy storage unit to receive the regenerative energy at a second priority lower than the first priority, wherein the regenerative energy is generated from a braking operation of the vehicle.

In some embodiments, the electronic control unit is configured to control the second energy storage device to discharge energy to provide power to drive the plurality of wheels in response to a driving demand that requires high power, acceleration and/or traction.

In some embodiments, the first energy storage unit comprises a first battery management system coupled to the electronic control unit, wherein the first battery management system is configured to receive first commands from the electronic control unit to perform charge/discharge operations of the first energy storage unit; and the second energy storage unit comprises a second battery management system coupled to the electronic control unit, wherein the second battery management system is configured to receive second commands from the electronic control unit to perform charge/discharge operations of the second energy storage unit.

Some embodiments a method for controlling operation of a powertrain system of any of the embodiments described above, the method comprising: transmitting control signals to one or more of the first energy storage unit, the second energy storage unit, the DC bus, the first DC-DC converter, and/or the second DC-DC converter to control operations thereof.

The indefinite articles "a" and "an," as used herein in the specification and in the claims, unless clearly indicated to the contrary, should be understood to mean "at least one." As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This allows elements to optionally be present other than the elements specifically identified within the list of elements to which the phrase "at least one" refers, whether related or unrelated to those elements specifically identified.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of" or, when used in the claims, "consisting of" will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting.

The invention claimed is:

1. A powertrain system for a vehicle, the powertrain system comprising:
    a first energy storage unit configured to provide power to drive a first set of wheels of the vehicle and receive energy from one or more first drivetrain components associated with the first set of wheels to charge the first energy storage unit;
    a second energy storage unit configured to provide power to drive a second set of wheels of the vehicle different from the first set of wheels and receive energy from one or more second drivetrain components associated with the second set of wheels to charge the second energy storage unit, wherein the second energy storage unit has different energy storage and/or energy discharge characteristics than the first energy storage unit; and
    an electronic control unit coupled to the first energy storage unit and the second energy storage unit and programmed to control a charge and/or a discharge operation of the first energy storage unit or the second energy storage unit.

2. The powertrain system of claim 1, wherein the first energy storage unit comprises a high energy storage unit and the second energy storage unit comprises a high power unit.

3. The powertrain system of claim 1, wherein:
    the second set of wheels of the vehicle comprise at least one or more wheels not included in the first set of wheels of the vehicle.

4. The powertrain system of claim 1, wherein the one or more first drivetrain components and/or the one or more second drivetrain components include one or more components of a regenerative braking system.

5. The powertrain system of claim 1, further comprising a DC-DC converter coupled between the second energy storage unit and the one or more first drivetrain components associated with the first set of wheels, the DC-DC converter configured to:
    convert a DC voltage output from the second energy storage unit to a DC voltage required by the one or more first drivetrain components associated with the first set of wheels and/or convert a DC voltage output from the one or more first drivetrain components associated with the first set of wheels to a DC voltage required by the second energy storage unit for charging.

6. The powertrain system of claim 5, wherein the DC-DC converter is coupled between the first energy storage unit and the second energy storage unit and is configured to convert a DC voltage output from the second energy storage unit to a DC voltage required by the first energy storage unit for charging and/or convert a DC voltage output from the first energy storage unit to a DC voltage required by the second energy storage unit for charging.

7. The powertrain system of claim 6, wherein the first energy storage unit is configured to simultaneously:
    discharge energy to drive the first set of wheels; and
    discharge energy to the second energy storage unit to charge the second energy storage unit.

8. The powertrain system of claim 6, wherein the second energy storage unit is configured to simultaneously:
    discharge energy to drive the second set of wheels; and
    discharge energy to the first energy storage unit to charge the first energy storage unit.

9. The powertrain system of claim 6, wherein the electronic control unit is configured to:
    determine a state of charge level of the second energy storage unit; and
    in response to determining that the state of charge level of the second energy storage unit is less than a threshold level, control a charge and/or a discharge operation of the first energy storage unit or the second energy storage unit to:
        transfer energy from the first energy storage unit to the second energy storage unit to charge the second energy storage unit; and/or
        transfer regenerative energy generated from a braking operation of the vehicle to the second energy storage unit to charge the second energy storage unit.

10. The powertrain system of claim 6, wherein the first energy storage unit and the second energy storage unit are configured to output power at different voltages.

11. The powertrain system of claim 1, wherein the first energy storage unit and the second energy storage unit are configured to output power at a same voltage.

12. The powertrain system of claim 11, wherein the electronic control unit is configured to control the first energy storage unit to receive regenerative energy at a first priority and control the second energy storage unit to receive the regenerative energy at a second priority higher than the first priority, wherein the regenerative energy is generated from a braking operation of the vehicle.

13. The powertrain system of claim 1, wherein the first set of wheels of the vehicle and the second set of wheels of the vehicle are mutually exclusive.

14. The powertrain system of claim 11, further comprising:
    a first charging circuit coupled to the first energy storage unit and configured to charge the first energy storage unit from a first power source; and a second charging circuit coupled to the second energy storage unit and configured to charge the second energy storage unit from a second power source.

15. The powertrain system of claim 14, wherein the first power source and/or the second power source are external to the vehicle, and/or the first power source and/or the second power source are a regenerative braking system.

16. The powertrain system of claim 14, wherein the first power source and/or the second power source each is internal to the vehicle and configured to be active during operation of the vehicle.

17. The powertrain system of claim 1, wherein:
the first energy storage unit comprises a first battery management system coupled to the electronic control unit, wherein the first battery management system is configured to receive first commands from the electronic control unit to perform charge/discharge operations of the first energy storage unit;
the second energy storage unit comprises a second battery management system coupled to the electronic control unit, wherein the second battery management system is configured to receive second commands from the electronic control unit to perform charge/discharge operations of the second energy storage unit; and
the first energy storage unit is configured to operate under a constant net discharge.

18. A method for controlling operation of a powertrain system, the method comprising:
transmitting control signals from an electronic control unit to a first energy storage unit configured to provide power to drive a first set of wheels of a vehicle and receive energy from one or more first drivetrain components associated with the first set of wheels to charge the first energy storage unit and a second energy storage unit configured to provide power to drive a second set of wheels of the vehicle and receive energy from one or more second drivetrain components associated with the second set of wheels to charge the second energy storage unit, wherein the second energy storage unit has different energy storage and/or energy discharge characteristics than the first energy storage unit, wherein the control signals control a charge and/or discharge operation of the first energy storage unit or the second energy storage unit.

19. The powertrain system of claim 1, wherein the first energy storage unit and the second energy storage unit have a same chemistry.

20. A powertrain system for a vehicle, the powertrain system comprising:
an electronic control unit;
a first energy storage unit configured to provide power to drive a first set of wheels of the vehicle and operate under a constant net discharge, the first energy storage unit comprising a first battery management system coupled to the electronic control unit, wherein the first battery management system is configured to receive first commands from the electronic control unit to perform charge/discharge operations of the first energy storage unit; and
a second energy storage unit configured to provide power to drive a second set of wheels of the vehicle different from the first set of wheels, wherein the second energy storage unit has different energy storage and/or energy discharge characteristics than the first energy storage unit, and wherein the second energy storage unit comprises a second battery management system coupled to the electronic control unit, wherein the second battery management system is configured to receive second commands from the electronic control unit to perform charge/discharge operations of the second energy storage unit.

* * * * *